United States Patent
Takahashi et al.

(10) Patent No.: US 10,547,234 B2
(45) Date of Patent: Jan. 28, 2020

(54) VIBRATION ACTUATOR, WEARABLE TERMINAL, AND INCOMING-CALL NOTIFICATION FUNCTION DEVICE

(71) Applicants: Yuki Takahashi, Tokyo (JP); Chikara Sekiguchi, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(72) Inventors: Yuki Takahashi, Tokyo (JP); Chikara Sekiguchi, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 56 days.

(21) Appl. No.: 15/775,499

(22) PCT Filed: Nov. 10, 2016

(86) PCT No.: PCT/JP2016/083311
§ 371 (c)(1),
(2) Date: May 11, 2018

(87) PCT Pub. No.: WO2017/082326
PCT Pub. Date: May 18, 2017

(65) Prior Publication Data
US 2018/0367019 A1    Dec. 20, 2018

(30) Foreign Application Priority Data

Nov. 13, 2015 (JP) ................. 2015-223414

(51) Int. Cl.
*H02K 7/00* (2006.01)
*H02K 33/18* (2006.01)
(Continued)

(52) U.S. Cl.
CPC ............ *H02K 33/18* (2013.01); *H02K 5/173* (2013.01); *H04M 19/047* (2013.01)

(58) Field of Classification Search
CPC .......... H02K 7/08; H02K 33/00; H02K 41/02; H02K 5/16; H02K 33/18; H02K 5/173
(Continued)

(56) References Cited

U.S. PATENT DOCUMENTS 6,114,799 A    9/2000  Yoshida et al.
6,744,155 B1*  6/2004  Stoiber ................. H02K 41/02
                                                    310/15
(Continued)

FOREIGN PATENT DOCUMENTS

JP    07-015938 A    1/1995
JP    08-264318 A    10/1996
(Continued)

OTHER PUBLICATIONS

International Search Report from International Application No. PCT/JP2016/083311 dated Feb. 14, 2017.

*Primary Examiner* — Thanh Lam
(74) *Attorney, Agent, or Firm* — Brundidge & Stanger, P.C.

(57) ABSTRACT

An oscillatory actuator has: a fixed body that has a planar part and a flat coil disposed on the planar part; and a movable body that has a magnet facing the coil and oscillates in a reciprocating manner in one direction relative to the fixed body above the planar part via cooperation between the coil and the magnet. The fixed body has a pair of linear bearings that are respectively disposed along both side surfaces extending in said one direction of the movable body and are equipped with balls capable of rolling and coming into contact with the respective side surfaces. The movable body (Continued)

is supported via the balls of the linear bearings so as to be able to oscillate in said one direction.

14 Claims, 20 Drawing Sheets

(51) Int. Cl.
    *H02K 5/173* (2006.01)
    *H04M 19/04* (2006.01)

(58) Field of Classification Search
    USPC .......................................... 310/17, 25, 12.31
    See application file for complete search history.

(56) References Cited

U.S. PATENT DOCUMENTS

2011/0101796 A1    5/2011    Odajima et al.

2014/0265650 A1*    9/2014    Jeon ........................ H02K 33/16
    310/25
2015/0137627 A1*    5/2015    Katada .................... H02K 33/16
    310/25
2017/0250596 A1*    8/2017    Son .......................... H02K 1/12

FOREIGN PATENT DOCUMENTS

| | | |
|---|---|---|
| JP | 10-225150 A | 8/1998 |
| JP | 2001-016837 A | 1/2001 |
| JP | 2002-192073 A | 7/2002 |
| JP | 2008-291915 A | 12/2008 |
| JP | 2011-097747 A | 5/2011 |
| JP | 4875133 B2 | 2/2012 |
| JP | 2015-095943 A | 5/2015 |
| JP | 2015-112013 A | 6/2015 |
| WO | 2014/130946 A2 | 8/2014 |

* cited by examiner

VIBRATION ACTUATOR, WEARABLE TERMINAL, AND INCOMING-CALL NOTIFICATION FUNCTION DEVICE

TECHNICAL FIELD

The present invention relates to a vibration actuator, a wearable terminal and an incoming notification device.

BACKGROUND ART

Conventionally, a vibration actuator is known as a vibration generation source for notifying a user of incoming and the like of a mobile information terminal such as a mobile phone, or as a vibration generation source for transmitting, to a finger, a hand, a foot and the like, an operation touch of a touch panel and/or realism of a game apparatus such as a controller of a game machine (see, for example, PTLS 1 to 3).

The vibration actuator disclosed in PTL 1 is formed in a plate shape for the purpose of downsizing. The vibration actuator disclosed in PTL 1 has a flat plate shape in which a movable part is slidably supported with a shaft.

The vibration actuator disclosed in PTL 2 includes a stator including a coil and a housing, and a movable member including a magnet and a spindle disposed in the housing. In the vibration actuator disclosed in PTL 2, with the coil and the magnet, the movable member that is slidable with respect to the shaft linearly vibrates in the vibration direction with respect to the stator. The coil is wound around the movable part including the magnet.

In addition, PTL 3 discloses a VCM (Voice Coil Motor) actuator including an opposite flat coil and a flat magnet disposed above the flat coil.

Each of the movable members in the above-mentioned vibration actuators is slidably provided to the shaft, and elastically supported with the spring so as to be able to vibrate in the vibration direction. In VCM vibration actuators, no magnetic attractive force acts in a normal state because of their magnetic circuit configurations. In view of this, the movable part is elastically held mainly by the metal spring. In addition, it is known to mount the above-mentioned vibration actuators in the ring-shaped input device disclosed in PTL 4, which has a vibration communication function, for example.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent Publication No. 4875133
PTL 4
WO2014/130946

SUMMARY OF INVENTION

Technical Problem

However, in the case where the conventional vibration actuator is used for a ring-shaped input device and the like, when the flat-plate shaped actuator is attached to the ring device, a large attaching space is required, and consequently the ring-shaped device is required to be enlarged. In view of this, a vibration actuator which can be further downsized is desired.

In addition, in the vibration actuators disclosed in PTLS 1 to 3, the movable member is held only with the metal spring, and therefore the mechanical load is large. Consequently, the actuators might not be operated due to metal fatigue and/or damage depending on the driving condition, and product lifetime might be limited.

Further, in the case where a movable part is slidably supported with a support shaft in a flat-plate shaped actuator, restriction in the rotational direction is necessary, and it is conceivable to employ a part for sliding movement in addition to the shaft. In this case, however, the number of components and cost are increased, and the friction attenuation is increased because of the sliding movement part, and consequently, the output might be reduced. In addition, in the support shaft structure, the friction between the shaft and the slidably supported members might increase depending on the dimensional accuracy of the members slidably supported by the shaft and the degree of parallelism of two shafts, and the moving range of the movable member might be reduced. In view of this, particularly in the case where the device is downsized, highly precise assembling is required.

An object of the present invention is to provide an actuator, a wearable terminal and an incoming notification device, which can favorably vibrate, and can achieve downsizing with excellent assemblability and durability.

Solution to Problem

A vibration actuator according to embodiments of the present invention includes: a fixing body including a planar part and a flat coil disposed in the planar part; and a movable member including a magnet disposed opposite to the coil, the movable member being configured to vibrate back and forth in one direction with respect to the fixing body above the planar part by cooperation of the coil and the magnet. The fixing body includes a pair of linear bearings disposed along two side surfaces of the movable member, the two side surfaces being extended along the one direction, the pair of linear bearings including a ball capable of freely rolling and making contact with the two side surfaces, and the movable member is held through the ball of the pair of linear bearings such that the movable member is allowed to freely vibrate in the one direction.

A wearable terminal according to embodiments of the present invention includes the above-mentioned vibration actuator. In addition, an incoming notification device according to embodiments of the present invention includes the above-mentioned vibration actuator.

Advantageous Effects of Invention

According to the present invention, it is possible to provide an actuator which can favorably vibrate, and can achieve downsizing with excellent assemblability and durability.

DESCRIPTION OF EMBODIMENTS

Embodiments of the present invention are elaborated below with reference to the accompanying drawings.

Embodiment 1

Figure 1:
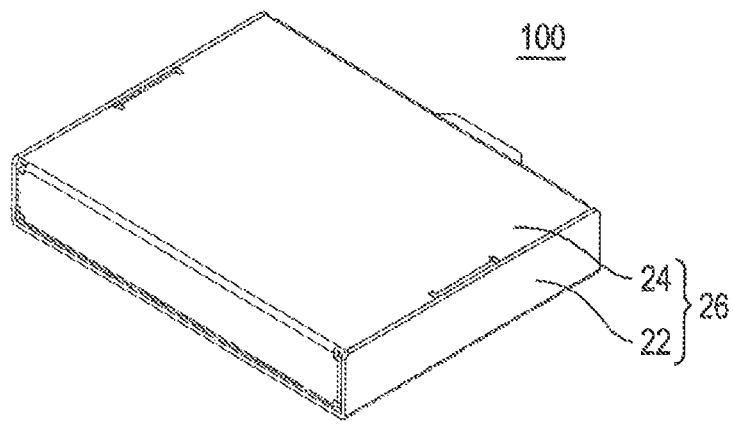
FIG. 1 illustrates an external configuration of a vibration actuator according to Embodiment 1 of the present invention.
Figure 2:
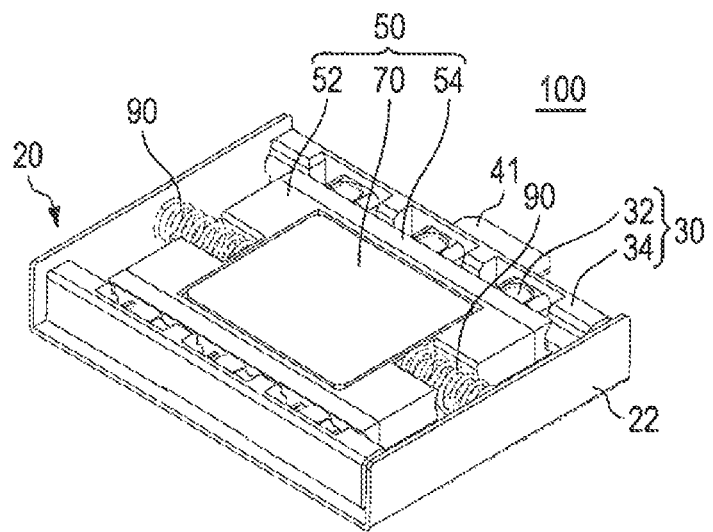
FIG. 2 is a perspective view illustrating an internal configuration of the vibration actuator.
Figure 3:
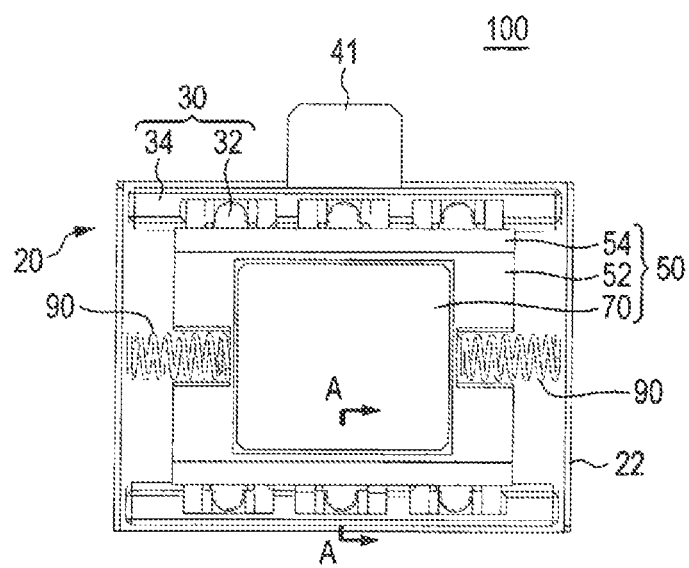
FIG. 3 is a plan view illustrating an internal configuration of the vibration actuator.
Figure 4:
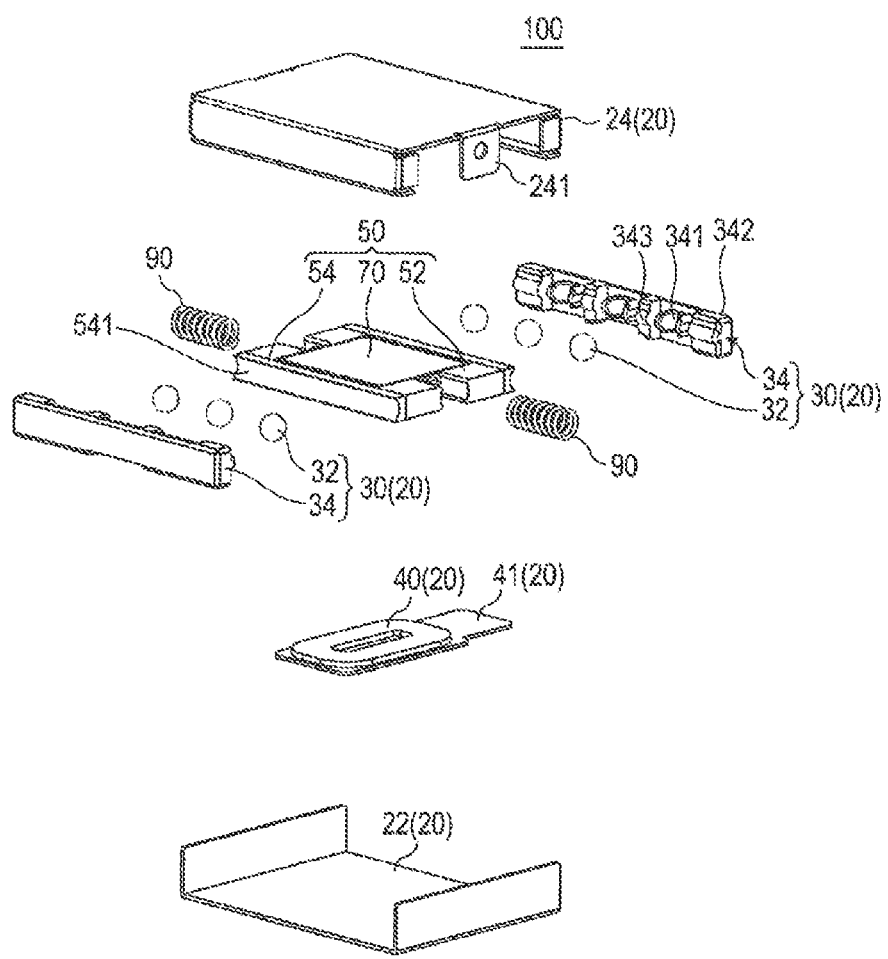
FIG. 4 is an exploded perspective view of the vibration actuator.
Figure 5:
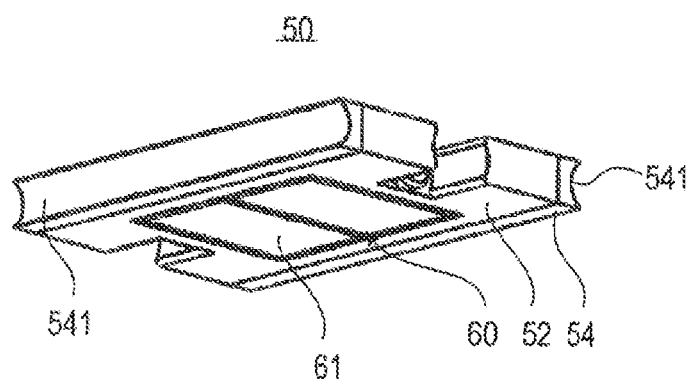
FIG. 5 is a perspective view of a movable member illustrated in FIG. 4 as viewed from the rear surface side.
Figure 6A:
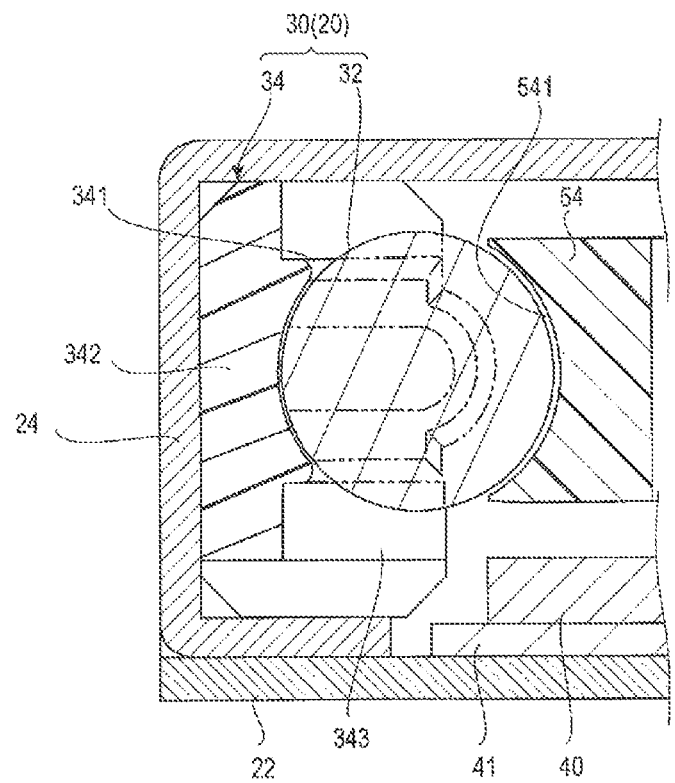
FIG. 6A is a sectional view taken along line A-A of FIG. 3, which illustrates a configuration of a main part of a linear bearing in the vibration actuator according to Embodiment 1 of the present invention.
Figure 6B:
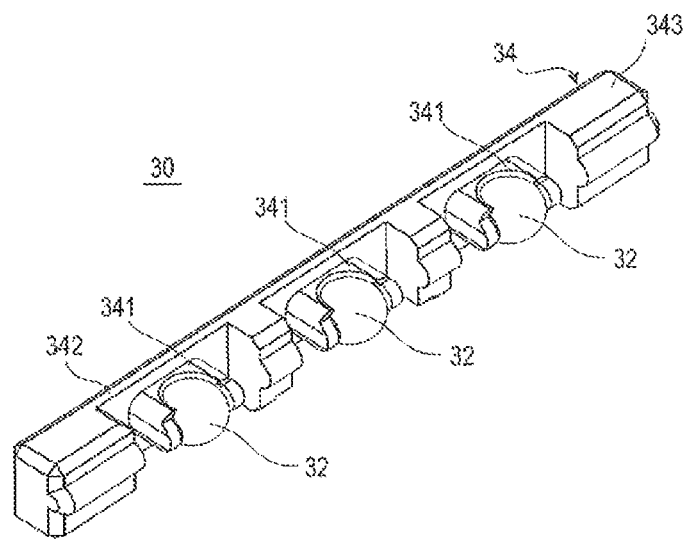
FIG. 6B is an enlarged perspective view of the linear bearing.
Figure 7:
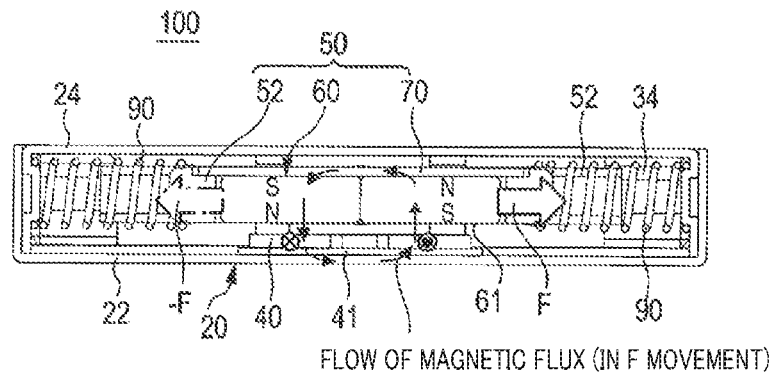
FIG. 7 illustrates movement of the movable member of the vibration actuator.

FIG. 1 illustrates an external configuration of a vibration actuator according to Embodiment 1 of the present invention, FIG. 2 is a perspective view illustrating an internal configuration of the vibration actuator, and FIG. 3 is a plan view illustrating an internal configuration of the vibration actuator. In addition, FIG. 4 is an exploded perspective view of the vibration actuator, and FIG. 5 is a perspective view of the movable member illustrated in FIG. 4 as viewed from the rear surface side. In addition, FIGS. 6A and 6B illustrate a configuration of a main part of a linear bearing in the vibration actuator according to Embodiment 1 of the present invention. Specifically, FIG. 6A is a sectional view taken along line A-A of FIG. 3, and FIG. 6B is an enlarged perspective view of the linear bearing. In addition, FIG. 7 illustrates movement of a movable member of the vibration actuator. It is to be noted that FIG. 7 illustrates a cross section along a vibration direction of the movable member, and schematically illustrates a configuration of a main part.

Vibration actuator 100 illustrated in FIG. 1 and FIG. 2 has a flat-plate like external shape composed of case 24 and cover 22. Vibration actuator 100 includes fixing body 20, movable member 50 that linearly vibrates back and forth (in one direction) with respect to fixing body 20 in housing 26, and metal spring 90 composed of a machine spring.

Fixing body 20 includes flat-plate shaped housing 26, linear bearing 30, and coil 40 connected with power supply part (in this case, Flexible Printed Circuit (FPC)) 41, and movable member 50 includes magnet 60, magnet holding part 52, roll contact part 54, and yoke 70.

Housing 26 includes a hollow part defined with cover 22 and case 24. In this hollow part, that is, in housing 26, linear bearing 30, coil 40, metal spring 90 and movable member 50 are disposed.

As illustrated in FIG. 2 and FIG. 3, cover 22 includes end wall parts opposed in the longitudinal direction (in this case, one direction the vibration direction of movable member 50) and raised from end sides of a rectangular-plate shaped bottom plate that serves as one of front and rear surfaces (in this case, the bottom surface) of housing 26.

As illustrated in FIGS. 4, 5, and 7, coil 40 is disposed such that the winding axis direction thereof is the thickness direction (in the drawing, the vertical direction) at an approximate center portion of the bottom plate of cover 22.

In the non-driving state, coil 40 is opposite to magnet 60 of movable member 50 in the direction orthogonal to the longitudinal direction (movement direction) at a position where their centers overlap.

Power supply part 41 is connected to coil 40. Power supply part 41 is a board for supplying power to coil 40, and is composed of a board such as a flexible printed circuit (FPC) that is connected with an external power source.

In cover 22, movable member 50 disposed separately from coil 40, metal springs 90 that sandwich movable member 50 in the movement direction such that movable member 50 is movable in the longitudinal direction, and linear bearings 30 are disposed.

In housing 26, linear bearing 30 is disposed so as to sandwich movable member 50 and metal spring 90 in the short direction, and in this case, linear bearing 30 is fixed on side portions of case 24 that extend in the longitudinal direction.

It is to be noted that case 24 includes an upper plate having a rectangular-plate shape and serving as the other of the front and rear surfaces of housing 26, in this case, as the top surface of housing 26. In case 24, linear bearing 30 is fixed in recesses of the side portions extending in the longitudinal direction of the upper plate. In addition, in case 24, a pair of upright pieces 241 is uprightly formed on the upper plate at center portions of side portions extending in the short direction of case 24, and movable member 50 is movably and elastically supported between upright pieces 241 through metal spring 90. With this configuration, movable member 50 is supported between the upper plate of case 24 and the bottom plate of cover 22, and between opposite linear bearings 30 such that movable member 50 is movable in the longitudinal direction.

Cover 22 is formed with a metal material together with case 24, and serves as an electromagnetic shield together with case 24.

As illustrated in FIG. 2 and FIG. 3, metal spring 90 and movable member 50 are disposed along the longitudinal direction such that movable member 50 is located at the center in housing 26 (cover 22 in FIG. 2 and FIG. 3). On the both sides along the longitudinal direction with respect to movable member 50, a pair of linear bearings 30 are disposed so as to face each other. In FIG. 2 and FIG. 3, for convenience of illustration, linear bearing 30, metal spring 90 and movable member 50 are located on the bottom plate of cover 22.

Linear bearing 30 supports movable member 50 such that movable member 50 is movable in the longitudinal direction, that is, in one linear direction with respect to fixing body 20.

As illustrated in FIG. 2 to FIG. 4, linear bearing 30 includes ball 32, and rail 34 that supports ball 32 such that ball 32 can roll.

Ball 32 may be made of any materials such as metal, resin, and non-magnetic substances. Rail 34 (in particular, holder part 341) is made of a non-magnetic substance, and is made of a resin material such as polyphenylene sulfide (PPS) resin and polyoxymethylene (polyacetal: POM) resin.

Rail 34 includes holder part 341 that holds ball 32 such that ball 32 freely rolls, long rail main body 342 provided with holder part 341, and projected wall part 343.

Rail main body 342 is disposed along the both side portions along the longitudinal direction of housing 26, and holder part 341 is formed at a partially cut out portion on the surface opposite to movable member 50. Holder part 341 is formed in a recessed shape (in this case, a U-shape in plan view), and holder part 341 holds therein ball 32 such that ball 32 freely rolls at the holding position without substantially moving in the longitudinal direction or the short direction.

As illustrated in FIG. 4 and FIGS. 6A and 6B, holder part 341 includes opposite pieces separated in the longitudinal direction and projecting toward movable member 50 side, and holds ball 32 between the opposite pieces so as to restrict movement of ball 32 in the longitudinal direction.

Rail 34 is provided with a plurality of holder parts 341 along the longitudinal direction (the movement direction of movable member 50).

On both sides of movable member 50, linear bearing 30 on one side includes at least one ball 32, and linear bearing 30 on the other side includes at least two balls 32. That is, the pair of linear bearings 30 includes two or more balls 32 on one side of movable member 50, and one or more balls 32 on the other side of movable member 50. In this case, three balls 32 are held on either side of movable member 50. In addition, each of the pair of linear bearings 30 may include a plurality of balls 32 along the longitudinal direction (one direction) such that the numbers of balls 32 are equal between two linear bearings 30. The pair of linear bearings 30 support movable member 50 through ball 32 such that movable member 50 is movable in the longitudinal direction. As long as linear bearing 30 supports movable member 50 such that movable member 50 is movable in the longitudinal direction, linear bearing 30 may have a configuration in which three or more balls 32 are provided in the entire linear bearing 30 in the longitudinal direction such that balls 32 can roll.

In this case, projected wall part 343 projecting toward movable member 50 side is provided at both ends in the longitudinal direction of holder part 341 that holds ball 32. It is to be noted that, as illustrated in FIG. 6B, projected wall part 343 may have a length substantially identical to that of the portion that holds and sandwiches ball 32 in the longitudinal direction such that ball 32 freely rolls in holder part 341 that restricts the movement of ball 32 in the longitudinal direction. Projected wall part 343 functions as a thick portion of rail 34.

Ball 32 makes point contact with roll contact part 54 of movable member 50 and movably guides movable member 50 in the longitudinal direction. It is to be noted that it is preferable to provide lubricant for reducing friction between holder part 341 and ball 32 and/or between ball 32 and roll contact part 54. In this case, lubricant such as grease (semisolid) and lubricating oil (liquid) is provided to the outer surface of ball 32.

As illustrated in FIG. 4 and FIG. 5, movable member 50 is formed in a plate shape, and magnet 60 has a rectangular shape and includes opposing surface 61 facing coil 40. In opposing surface 61, N pole and S pole are arranged in the direction orthogonal to the winding axis direction of coil 40.

Yoke 70 is fixed on magnet 60 on the side opposite to coil 40.

Yoke 70 is attached on the surface of magnet 60 on the side opposite to coil 40 so as to cover the surface and face the upper plate of case 24. With this configuration, yoke 70 allows a magnetic flux between coil 40 and magnet 60 to pass with no air gap therebetween, thereby increasing the efficiency of the magnetic circuit and increasing the thrust constant to movable member 50.

Magnet 60 is held by magnet holding part 52 so as to face coil 40. As illustrated in FIG. 7, in the non-driving state, magnet 60 is supported such that magnet 60 faces coil 40 and that the boundary between N pole and S pole is located at the center of coil 40. In the driving state, magnet 60 is linearly vibrated back and forth in the longitudinal direction as one direction with respect to the position of the non-driving state as a reference position.

Magnet holding part 52 is formed in a flat rectangular frame shape that encloses magnet 60.

Magnet holding part 52 is formed with an iron material or a non-iron material such as a sintered material and a sheet metal member such as an SECC (electricity zinc plating steel sheet) for example, and in this case, magnet holding part 52 is formed with a high-specific gravity material having a specific gravity higher than that of an SECC and the like. In this case, examples of the high-specific gravity material include tungsten or tungsten alloy whose specific gravity is 16 to 19 with respect to an SECC having a specific gravity of 7.8.

In magnet holding part 52, center portions of respective frame side portions opposite to each other in the longitudinal direction in the rectangular frame are cut out. One end of metal spring 90 is attached in the cutout part, and magnet 60 and yoke 70 held by magnet holding part 52 are elastically supported through metal spring 90.

Roll contact part 54, which makes point contact with linear bearing 30 and allows for relative movement in the longitudinal direction with respect to linear bearing 30, is provided at side portions of magnet holding part 52 in the longitudinal direction.

Roll contact part 54 includes ball receiving portion 541 (which corresponds to the side surfaces of the movable member) formed on the external side surfaces of magnet holding part 52 and configured to receive ball 32 such that ball 32 freely rolls. Ball receiving portion 541 may have any shape as long as ball 32 can freely roll. For example, ball receiving portion 541 is formed in a U-shape or a V-shape extending in the longitudinal direction and disposed in ball receiving portion 541 such that a part of ball 32 protruding from rail 34 side can make contact with ball receiving portion 541. In the present embodiment, ball receiving portion 541 is formed in a U-shape, and when ball 32 is formed in a V-shape, the contact area with ball 32 can be reduced than the U-shape. Ball 32 rolls in ball receiving portion 541. With this configuration, roll contact part 54 can move in the longitudinal direction with respect to rail 34 through ball 32.

Ball receiving portion 541 supports ball 32 such that ball 32 rolls only in the longitudinal direction. With this configuration, movable member 50 is supported so as to be movable only in the longitudinal direction with respect to linear bearing 30.

When movable member 50 moves, no slipping friction or sliding friction is generated between roll contact part 54 and linear bearing 30, while a roll friction of rolling ball 32 is generated. It is to be noted that since the ratio of the slipping friction to the roll friction is 1:0.0001 to 0.001 or smaller, the configuration using linear bearing 30 can prevent thrust attenuation of movable member 50 in comparison with the slipping friction.

Preferably, roll contact part 54 is a member having surface smoothness, dimensional stability, and wear resistance, and may be formed with a resin material such as POM, brass and stainless-steel (SUS303). It is to be noted that roll contact part 54 may be formed integrally with magnet holding part 52. As the mass of movable member 50 increases, the intensity of vibration (output) increases; therefore, in the case where a high-specific gravity material is used for magnet holding part 52, the mass of movable member 50 can be further increased while reducing cost and man hours by integrally forming roll contact part 54 in magnet holding part 52.

Metal spring 90 is a cylindrical coil spring that is fixed to upright piece 241 at one end portion, and is fixed to the spring attaching portion of magnet holding part 52 at the other end portion. It is to be noted that metal spring 90 is merely an example of a machine spring, and metal spring 90 may be replaced by a resin spring as a machine spring in Embodiments 1, 3 and 5 to 8.

The axial center of metal spring 90 that is a cylindrical coil spring is located on the axis extending in the longitudinal direction in axis in magnet holding part 52, that is, the axis of movable member 50. Metal spring 90 is disposed along one direction on the two sides of opposing surface 61 in the longitudinal direction (one direction) such that movable member 50 is elastically supported by fixing body 20.

Coil 40 is disposed above cover 22 and magnet 60 is disposed so as to face coil 40, and accordingly, a magnetic attractive force is generated between cover 22 and magnet 60 as magnetic substances. With this magnetic attractive force, cover 22 and magnet 60 are attracted to each other. The magnetic attractive forces between magnet 60 and cover 22 on coil 40 side, or, the magnetic attractive force of case 24 on the side opposite to cover 22 that is added to the above-mentioned magnetic attractive forces act between linear bearing 30 and roll contact part 54, as a force for eliminating rattles therebetween, or, as a force (preload) for restricting movement of movable member 50 in directions other than the movable direction (a direction perpendicular to movable direction and the like) although the forces are weaker than the spring force of metal spring 90. The preload eliminates rattle between linear bearing 30 and roll contact part 54, and movable member 50 is positioned so as to move only in the movable direction (positioning of movable member 50).

As described, in vibration actuator 100, opposing surface 61 in which N pole and S pole are arranged of magnet 60 faces coil 40 of fixing body 20, and movable member 50 including magnet 60 is elastically supported by metal spring 90 as a machine spring disposed in the movable direction.

When coil 40 is excited by power supplied from power supply part 41, movable member 50 vibrates back and forth in the longitudinal direction, that is, in a direction orthogonal to the circumferential direction.

For example, when power is fed to coil 40 with the magnetic flux flow illustrated in FIG. 7 (a flow of F magnetic flux (in F movement)), since the current flowing through coil 40 is set be orthogonal to the magnetic flux from magnet 60, the Lorentz force generated therein generates a force, and an operation reaction force is generated in movable member 50 thus driving the member in the F-direction. In addition, when opposite current is supplied to coil 40, magnet 60 is returned to the reference position at the time of switching, a force is generated in coil 40 by the Lorentz force, an operation reaction force is generated in movable member 50, and movable member 50 is driven in the −F-direction opposite to the F-direction.

In vibration actuator 100, coil 40 is excited with an alternating current provided to coil 40 from power supply part 41, and a magnetic attractive force and a repulsing force with respect to magnet 60 on movable member 50 side are effectively generated. With this configuration, a thrust of the F-direction and a thrust of the −F-direction are applied to magnet 60 of movable member 50 with respect to a position that serves as a driving reference position (in this case, a position where the center of magnet 60 at the boundary between the N pole surface and the S pole surface on coil 40 side overlaps the center of coil 40 just above coil 40). With this configuration, magnet 60 vibrates back and forth in the F-direction and the −F-direction along the longitudinal direction. That is, movable member 50 is guided by linear bearing 30 to vibrate back and forth with respect to fixing body 20 in a direction along the N pole surface and the S pole surface facing coil 40 in magnet 60. This driving operation is described below. It is to be noted that the driving operation of vibration actuator 100 of the present embodiment applies to the vibration actuator of each embodiment.

In vibration actuator 100 of the present embodiment, when the mass of movable member 50 is m[kg], and spring constant in the twisting direction of metal spring 90 is $K_{sp}$, movable member 50 vibrates with respect to fixing body 20 at resonance frequency $f_r$ [Hz] calculated from the following Expression (1).

[Ex. 1]

$$f_r = \frac{1}{2\pi}\sqrt{\frac{K_{sp}}{m}} \quad (1)$$

In vibration actuator 100F of the present embodiment, an alternating current having a frequency substantially equal to resonance frequency $f_r$ of movable member 50 is supplied from power supply part 41 to coil 40. Coil 40 is excited in this manner and movable member 50 is efficiently moved.

Movable member 50 in this vibration actuator 100 is in a state where movable member 50 is supported by a spring-mass structure in which movable member 50 is supported by fixing body 20 through metal spring 90. Accordingly, when an alternating current having a frequency equal to resonance frequency $f_r$ of movable member 50 is supplied to coil 40, movable member 50 is driven in a highly efficient resonance state.

An equation of motion and a circuit equation representing the driving operation of vibration actuator 100 are as follows. Vibration actuator 100 is driven based on an equation of motion expressed by the following Expression (2) and a circuit equation expressed by the following Expression (3).

[Ex. 2]

$$m\frac{d^2x(t)}{dt^2} = K_f i(t) - K_{sp}x(t) - D\frac{dx(t)}{dt} \quad (2)$$

m: mass [Kg]
x(t): displacement [m]
Kf: thrust constant [N/A]
i(t): current [A]
$K_{sp}$: spring constant [N/m]
D: attenuation coefficient [N/(m/s)]

[Ex. 3]

$$e(t) = Ri(t) + L\frac{di(t)}{dt} + K_e\frac{dx(t)}{dt} \quad (3)$$

e(t): voltage [V]
R: resistance [Ω]
L: inductance [H]
Ke: counter electromotive force constant [V/(m/s)]

That is, mass m[Kg], displacement x (t)[m], thrust constant Kf[N/A], current i (t)[A], spring constant $K_{sp}$[N/m], attenuation coefficient D[N/(m/s)] and the like in vibration actuator 100 may be appropriately changed as long as Expression (2) is satisfied. In addition, voltage e (t) [V], resistance R[Ω], inductance L[H], and counter electromotive force constant $K_e$[V/(m/s)] may be appropriately changed as long as Expression (3) is satisfied.

In this manner, when vibration actuator 100 is driven with resonance frequency $f_r$ that is determined by mass m of movable member 50 and spring constant $K_{sp}$ of the spring material (in this case, metal spring 90), an effectively large output can be obtained.

Vibration actuator 100 includes cover (planar part) 22, fixing body 20 including flat coil 40 disposed to cover 22, and movable member 50 including magnet 60 that faces coil 20 and configured to vibrate back and forth above cover 22 or case 24 with respect to fixing body 20 in one direction (longitudinal direction) in conjunction with coil 40 and magnet 60. Fixing body 20 includes a pair of linear bearings 30. Linear bearings 30 extend along ball receiving portions (side surfaces) 541 extending along the longitudinal direction (one direction) in movable member 50, and includes ball 32 capable of freely rolling and making contact with ball receiving portions (side surfaces) 541. Movable member 50 is held such that movable member 50 can freely vibrate in the longitudinal direction (one direction) through ball 32 of linear bearing 30. With a Lorentz force generated by coil 40 fed with power, movable member 50 vibrates back and forth in the longitudinal direction. Vibration actuator 100 is driven by a driving source of a VCM type.

Vibration actuator 100 can provide the following effects.
<Effect 1>

Movable member 50 is supported by linear bearing 30 such that movable member 50 can vibrate back and forth in the longitudinal direction, and thus it is possible to suppress increase of friction with the members that movably support movable member 50.

In a conventional support shaft structure in which a movable member is supported by a shaft such that the movable member can freely vibrate back and forth, one or two shafts are used. As a result, depending on the dimensional accuracy of the member slidably supported by the shaft and the degree of parallelism of two shafts, the friction between the shaft and the slidably supported member might be large, and the moving range of the movable member might be small. Additionally, in a structure using a sliding bearing and/or a sliding shaft part, friction is generated, and consequently the thrust of the movable member attenuates, resulting in reduction in the moving range. In view of this, in the conventional structure, highly precise assembling is required.

In contrast, in vibration actuator 100 of Embodiment 1, movable member 50 is supported through linear bearing 30 such that movable member 50 is movable in the longitudinal direction, and therefore the shaft that has to be highly precisely assembled is not required. That is, in comparison with the conventional structure, vibration actuator 100 can be readily assembled, and assemblability can be improved.

In addition, when vibration actuator 100 is driven by supplying power to coil 40, the thrust of movable member 50 is not attenuated by friction of the movement, and efficient vibration can be performed by increasing the moving range of movable member 50. It is thus possible to provide an actuator that can achieve downsizing, and can favorably vibrate with excellent assemblability and durability.

<Effect 2>

In addition, movable member 50 is elastically supported by metal spring 90 as a machine spring disposed in the movable direction, and thus highly efficient driving of movable member 50 can be achieved by utilizing a resonance of a spring-mass.

<Effect 3>

Linear bearings 30 disposed on the both sides of movable member 50 equally have balls 32, and therefore movable member 50 can be linearly vibrated back and forth with good balance and minimum cost in an efficient manner.

<Effect 4>

Cover 22 in which coil 40 is attached is formed with a magnetic substance. Accordingly, flux linkage of coil 40 increases in a magnetic path of a magnetic circuit of coil 40, magnet 60 disposed opposite to coil 40, and yoke 70 joined to magnet 60. With this configuration, the efficiency of the magnetic circuit is improved, and the linear vibration of movable member 50 can be achieved with high efficiency.

<Effect 5>

Magnet holding part 52 is formed with a high-specific gravity material such as tungsten having a specific gravity higher than a material such as an SECC and the like. With this configuration, even when the mass of the movable member whose external size is restricted for its design or the like is desired to be increased, the mass of the movable member can be increased since the specific gravity of the high-specific gravity material is about 16 to 19, and as a result, the vibration output of movable member 50 can be increased.

Embodiment 2

Figure 8:
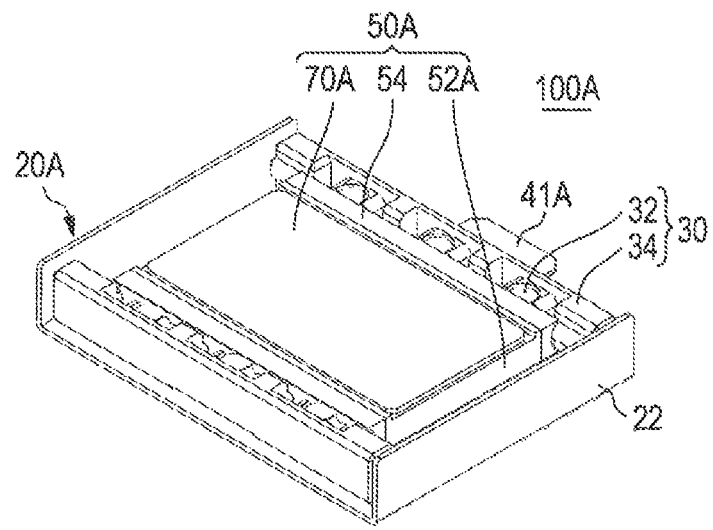
FIG. 8 is a perspective view illustrating an internal configuration of a vibration actuator according to Embodiment 2 of the present invention.
Figure 9:
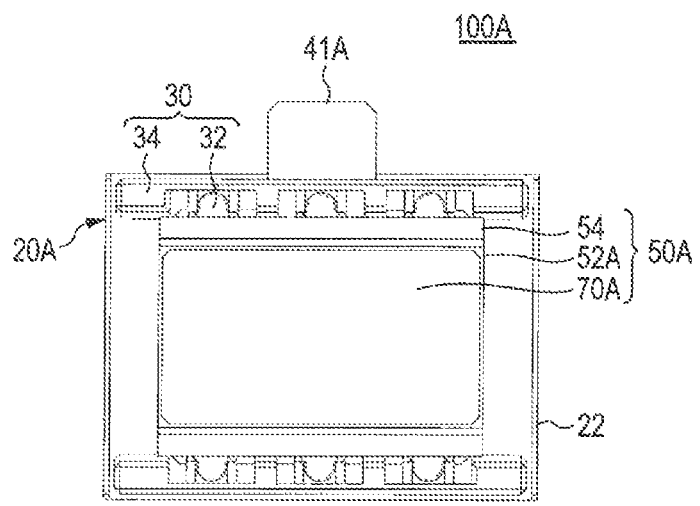
FIG. 9 is a plan view illustrating an internal configuration of the vibration actuator.
Figure 10:
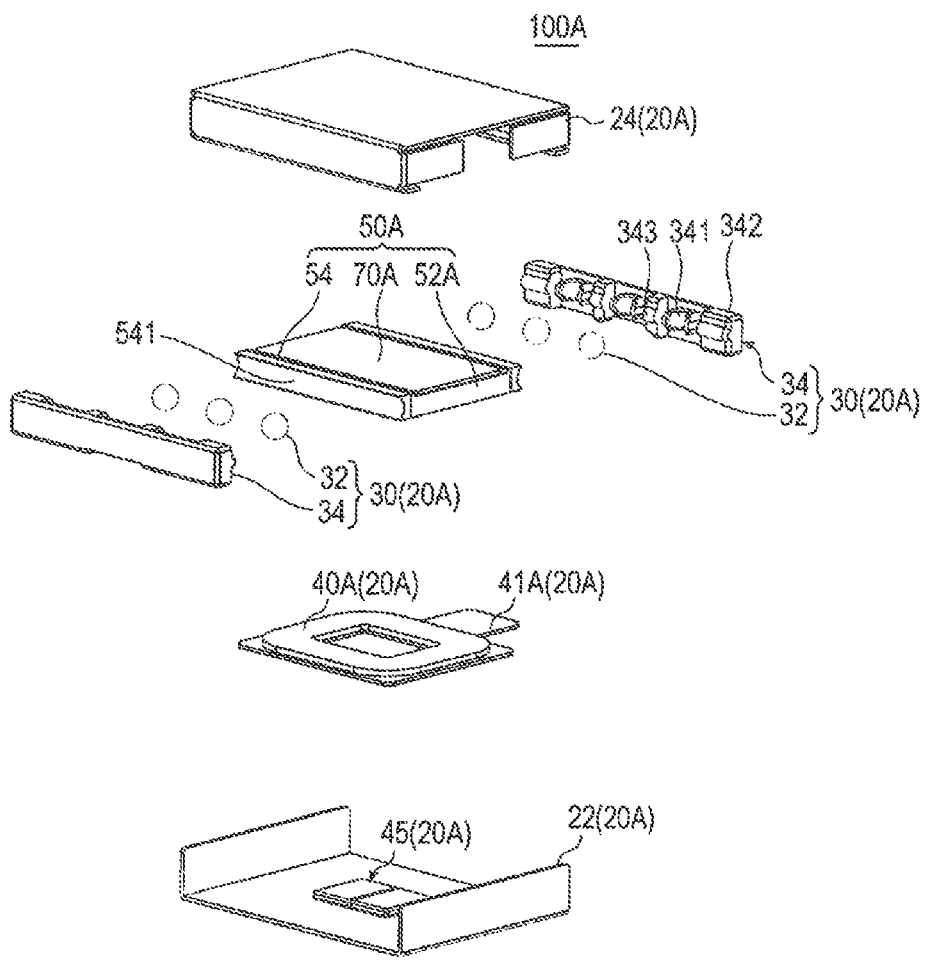
FIG. 10 is an exploded perspective view of the vibration actuator.
Figure 11:
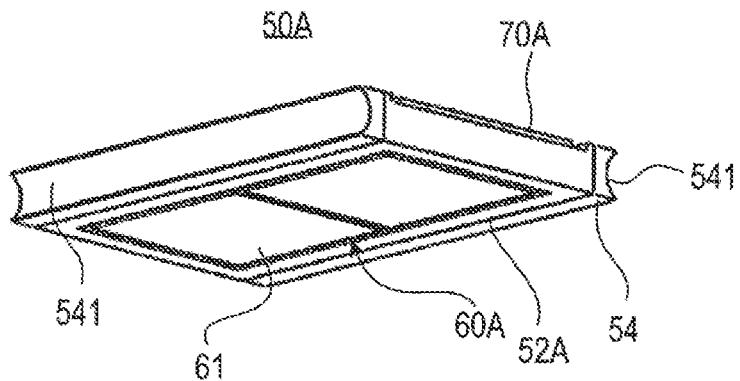
FIG. 11 is a perspective view of a movable member illustrated in FIG. 10 as viewed from the rear surface side.
Figure 12:
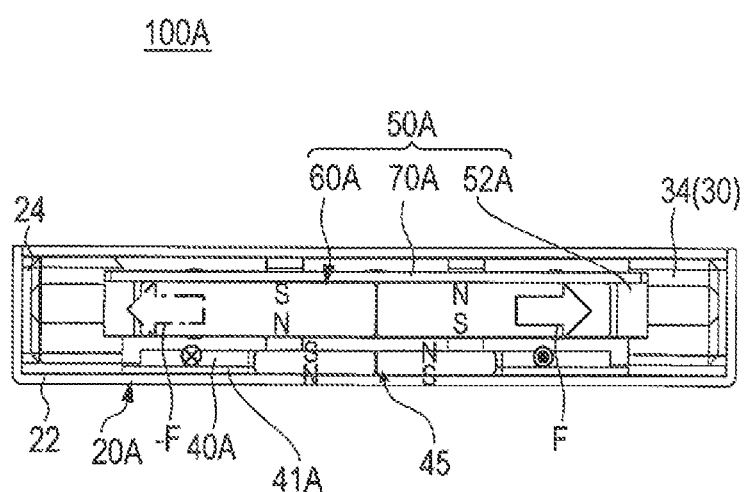
FIG. 12 illustrates movement of a movable member of the vibration actuator according to Embodiment 2 of the present invention.

FIG. 8 is a perspective view illustrating an internal configuration of a vibration actuator according to Embodiment 2 of the present invention, FIG. 9 is a plan view illustrating an internal configuration of the vibration actuator, and FIG. 10 is an exploded perspective view of the vibration actuator. In addition, FIG. 11 is a perspective view of the movable member illustrated in FIG. 10 as viewed from the rear surface side, and FIG. 12 illustrates movement of the movable member of the vibration actuator according to Embodiment 2 of the present invention.

Vibration actuator 100A illustrated in FIG. 8 to FIG. 12 has a configuration in which positioning magnet (other magnet) 45 as a magnetic spring is provided in place of metal spring 90 that supports movable member 50 in the configuration of vibration actuator 100. It is to be noted that regarding the components of vibration actuator 100A, the components same as those of vibration actuator 100 are denoted with the same reference numerals and description thereof is omitted, and the components having configurations same as those of vibration actuator 100 except in their shapes are denoted with the same names.

Vibration actuator 100A illustrated in FIG. 8 to FIG. 12 has an external appearance similar to that of vibration actuator 100 illustrated in FIG. 1, and includes fixing body 20A and movable member 50A.

Fixing body 20A includes housing 26, linear bearing 30, coil 40A connected with power supply part (in this case, a board) 41A, and positioning magnet 45, and movable member 50A includes magnet 60A (see FIGS. 11 and 12), magnet holding part 52A, roll contact part 54, and yoke 70A.

Cover 22A is similar to cover 22. Cover 22A may be formed with a magnetic substance.

In cover 22A, at an approximate center portion of a bottom plate having a rectangular-plate shape in which wall parts are raised from end sides opposite to each other in the longitudinal direction (in this case, the vibration direction of movable member 50A), coil 40A is fixed such that the winding axis direction thereof is the thickness direction (in the drawing, the vertical direction).

In the non-driving state, coil 40A is opposite to magnet 60A of movable member 50A in the direction orthogonal to the longitudinal direction (movement direction) at a position where their centers overlap. As with coil 40, power supply part 41A that supplies power to coil 40A is connected to coil 40A.

In coil 40A, positioning magnet 45 is arranged.

The number of the magnetic poles of positioning magnet 45 is equal to that of opposing surface 61 of magnet 60A, and positioning magnet 45 is formed such that, at the reference position in the non-driving state, the magnetic poles facing respective magnetic poles of opposing surface 61 in a direction orthogonal to movement direction opposite position are different from the respective magnetic poles of opposing surface 61. That is, at the reference position, the magnetic poles of positioning magnet 45 are S pole and N pole, which are respectively attracted to N pole and S pole of opposing surface 61 of magnet 60A.

As illustrated in FIG. 10 and FIG. 11, movable member 50A is formed in a plate shape. Magnet 60A has a rectangular shape, and includes opposing surface 61 facing coil 40A, in which N pole and S pole are arranged in the direction orthogonal to the winding axis direction of coil 40. It is to be noted that plate-shaped yoke 70A is fixed on the entire surface, which includes the top surface of magnet holding part 52A, of magnet 60A on the side opposite to opposing surface 61 of magnet 60A.

As with yoke 70, yoke 70A is attached on magnet 60A, and allows the magnetic flux between coil 40A and magnet 60A to pass with no air gap therebetween, thereby increasing efficiency of the magnetic circuit so as to increase the thrust constant to movable member 50A.

As illustrated in FIG. 12, in the non-driving state, magnet 60A is held by magnet holding part 52A having a rectangular frame shape so as to face coil 40A and positioning magnet 45. In opposing surface 61 opposite to coil 40A of magnet 60A located at the reference position in the non-driving state, the boundary (the center of movable member 50A in the movement direction) between N pole and S pole arranged in the longitudinal direction (movement direction) is located at the center of coil 40A. In the driving state, movable member 50A is linearly vibrated back and forth in the longitudinal direction with respect to the position of the non-driving state as a reference position.

Magnet holding part 52A is formed in a flat rectangular frame shape that encloses magnet 60A (see FIGS. 10 to 12), and makes contact with linear bearing 30 at roll contact parts 54 provided at the side portions so as to be supported movably in the longitudinal direction with respect to linear bearing 30.

Linear bearing 30 is elastically held by a magnetic spring formed by magnet 60A and positioning magnet 45 on fixing body 20A side that faces opposing surface 61 of magnet 60A, and movable member 50A is positioned at the reference position.

While positioning magnet 45 is disposed in coil 40A in the present embodiment, the present invention is not limited to this, and another configuration may be employed in which positioning magnet 45 is disposed in a region around coil 40A and the magnetic pole on magnet 60A side is disposed so as to face positioning magnet 45.

Vibration actuator 100A is driven by an electromagnetic operation similar to that of vibration actuator 100. For example, as illustrated in FIG. 12, opposing surface 61 of magnet 60A is set to N pole and S pole arranged in the longitudinal direction, and magnetic poles of positioning magnet 45 opposite thereto in coil 40A are set to S pole opposite to N pole of opposing surface 61, and N pole opposite to S pole of opposing surface 61. The boundaries between the magnetic pole N and the magnetic pole S arranged in the longitudinal direction overlap. In addition, as illustrated in FIG. 12, when a current is supplied to coil 40A, a Lorentz force is generated by a magnetic flux flow similar to that of Embodiment 1, and a thrust in the F-direction is exerted on movable member 50A by an operation reaction force, thus linearly moving the member in the F-direction. After movable member 50A is moved in the F-direction, an opposite current is supplied to coil 40A, and thus a thrust in the –F-direction opposite to F-direction is exerted on movable member 50A.

Movable member 50A is supported movably in the longitudinal direction in the state where it is elastically held by positioning magnet 45 as a magnetic spring. When an alternating current having a frequency substantially equal to resonance frequency $f_r$ of movable member 50A is supplied from power supply part 41A to coil 40A to excite coil 40A, movable member 50A vibrates back and forth in the F direction and the –F-direction along the longitudinal direction with respect to a position that serves as the reference position (in this case, the position where the center of the opposing surface of the positioning magnet in the longitudinal direction overlaps the center between the N pole and the S pole of magnet 60A). It is to be noted that this driving operation is similar to that of vibration actuator 100 of Embodiment 1 that is achieved based on Expressions (1), (2) and (3).

In this manner, in vibration actuator 100A, with an alternating current provided to coil 40A from power supply part 41A, a magnetic attractive force and a repulsive force are effectively generated with respect to coil 40A of fixing body 20A, and thus movable member 50A efficiently and linearly vibrates back and forth, or, vibrates.

Vibration actuator 100A is driven by a driving source of a VCM type. Movable member 50A includes magnet 60A in which N pole and S pole are arranged in opposing surface 61, and fixing body 20 includes coil 40A and positioning magnet 45 disposed opposite to opposing surface 61 of magnet 60A, and linear bearing 30 that supports movable member 50A in the longitudinal direction (one direction) such that movable member 50A can freely vibrate back and forth. With a thrust utilizing a Lorentz force generated by coil 40A fed with power, movable member 50A linearly vibrates back and forth in the longitudinal direction. With this configuration, the following effects can be achieved while achieving effects similar to <Effect 1>.

<Effect 6>

With positioning magnet 45 facing magnet 60A and disposed at a center portion of cover 22, magnet 60A can be positioned at the reference position (in this case, at a center portion of cover 22) by attracting magnet 60A to a center portion of cover 22 without using metal spring 90.

That is, movable member 50A driven by the magnetic circuit of coil 40A and magnet 60A can be movably positioned at the reference position with the magnetic spring using positioning magnet 45. With this configuration, resonance of a spring-mass can be utilized for movable member 50A, and highly efficient linear vibration of movable member 50A can be achieved. In addition, since the movable member is supported by the magnetic spring using positioning magnet 45, no metal fatigue of the metal spring is caused unlike the configuration in which the movable member is supported with a metal spring. That is, highly reliable vibration actuator 100A can be ensured.

<Effect 7>

Further, a state where a preload is applied to movable member 50A by a magnetic attractive force of magnet 60A and positioning magnet 45 relatively attracted to each other is established. That is, in the non-driving state, a preload is exerted on ball 32 of linear bearing 30 that supports movable member 50A, and the clearance between ball 32 and rail 34 or between ball 32 and roll contact part 54 is eliminated. Thus backlash noise due to the clearance is not generated, and noise reduction in movable member 50A can be achieved. In addition, movable member 50A can vibrate back and forth with a good lateral balance through linear bearing 30.

Embodiment 3

Figure 13:
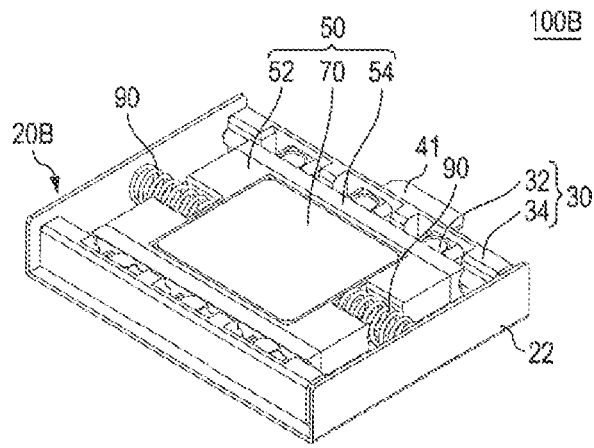
FIG. 13 is a perspective view illustrating an internal configuration of a vibration actuator according to Embodiment 3 of the present invention.
Figure 14:
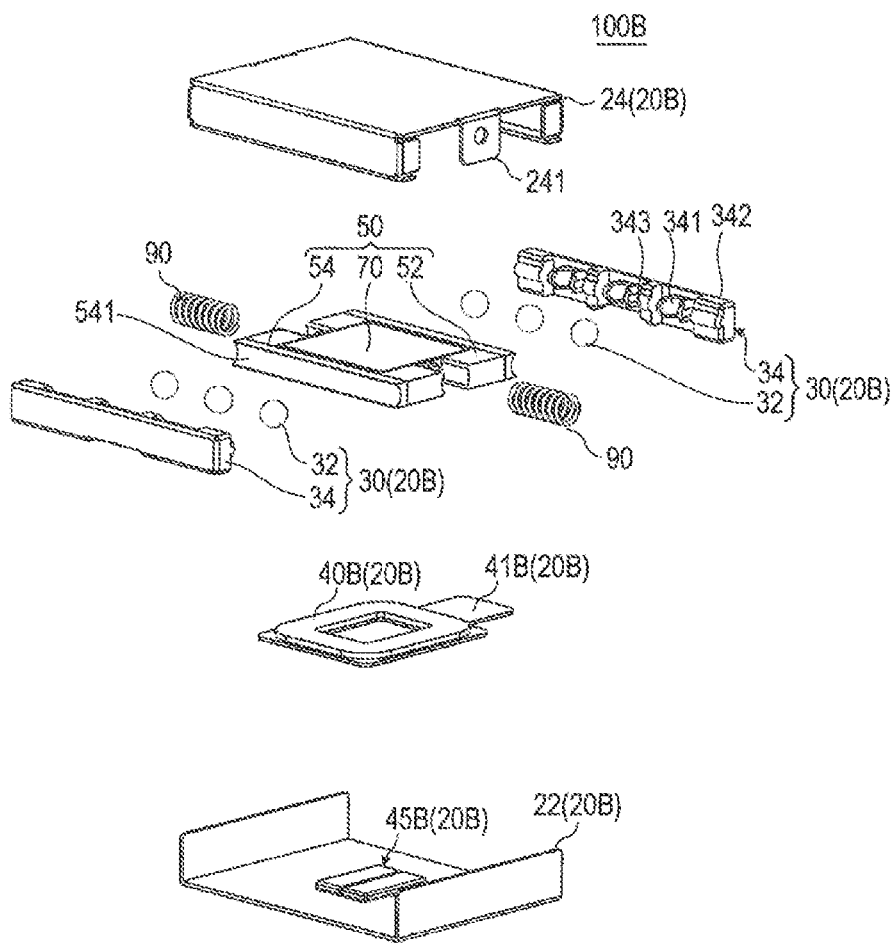
FIG. 14 is an exploded perspective view of the vibration actuator.
Figure 15:
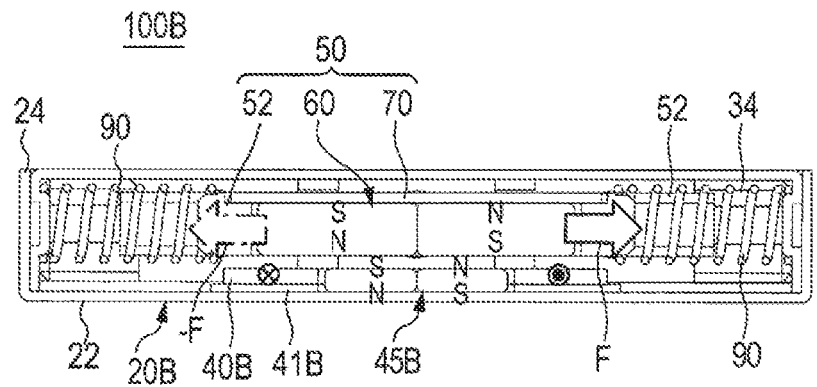
FIG. 15 illustrates movement of a movable member of the vibration actuator.

FIG. 13 is a perspective view illustrating an internal configuration of a vibration actuator according to Embodiment 3 of the present invention, FIG. 14 is an exploded perspective view of the vibration actuator, and FIG. 15 illustrates movement of a movable member of the vibration actuator.

Vibration actuator 100B illustrated in FIG. 13 to FIG. 15 has a configuration in which a positioning magnet of vibration actuator 100A is added in the configuration of vibration actuator 100. In vibration actuator 100B, movable member 50 is elastically supported by metal spring 90 that is a cylindrical coil spring, and a magnetic attractive force of a magnetic spring generated by magnet 60 and positioning magnet (other magnet) 45B.

It is to be noted that regarding the components of vibration actuator 100B, the components same as those of vibration actuator 100 are denoted with the same reference numerals and description thereof is omitted, and the components having configurations same as those of vibration actuator 100 except in their shapes are denoted with the same names.

Vibration actuator 100B illustrated in FIG. 13 to FIG. 15 has an external appearance similar to that of vibration actuator 100 illustrated in FIG. 1. Vibration actuator 100B includes fixing body 20B, movable member 50, and metal spring 90, and elastically supports movable member 50 such that movable member 50 is movable by fixing body 20B through metal spring 90.

Fixing body 20B includes cover 22 and case 24 that form a flat-plate shaped housing, linear bearing 30, coil 40B connected with power supply part (in this case, a board) 41, and positioning magnet 45B.

Fixing body 20B is formed similarly to fixing body 20, and coil 40B and positioning magnet 45B facing magnet 60 of movable member 50 are arranged at a center portion of the bottom plate of cover 22. Positioning magnet 45B is formed similarly to positioning magnet 45, and is disposed inside coil 40B.

As illustrated in FIG. 15, the number of the magnetic poles of positioning magnet 45B is equal to that of opposing surface 61 of magnet 60, and positioning magnet 45B is formed such that, at the reference position in the non-driving state, the magnetic poles facing respective magnetic poles of opposing surface 61 in a direction orthogonal to movement direction are different from the respective magnetic poles of opposing surface 61. That is, at the reference position, the magnetic poles of positioning magnet 45B are S pole and N pole, which are respectively attracted to N pole and S pole of opposing surface 61 of magnet 60.

In vibration actuator 100B, movable member 50 is provided with magnet 60 including opposing surface 61 in which N pole and S pole are arranged. Fixing body 20B is provided with coil 40B disposed opposite to opposing surface 61 of magnet 60, linear bearing 30 that supports movable member 50 such that movable member 50 can freely vibrate back and forth in the longitudinal direction (one direction), and positioning magnet 45B. In vibration actuator 100B, movable member 50 vibrates back and forth with an electromagnetic operation by magnet 60 and coil 40B. Vibration actuator 100B is driven by a driving source of a VCM type. While being supported by linear bearing 30 with a Lorentz force generated by feeding power to coil 40B opposite to magnet 60 and a resulting operation reaction force, movable member 50 vibrates back and forth in the longitudinal direction.

In vibration actuator 100B, with the magnetic attractive force between magnet 60 and positioning magnet 45B, a preload is exerted on movable member 50 elastically supported through metal spring 90, thereby suppressing rotation of movable member 50 and performing the positioning. It is to be noted that, in this case, the term "preload" is a force of attracting magnet 60 and positioning magnet 45B to each other with the magnetic attractive force therebetween so as to eliminate rattle of ball 32 of linear bearing 30 supporting movable member 50, or, a force for restricting a movement in directions other than the movable direction (the direction orthogonal to the movement direction and the like).

That is, in vibration actuator 100B, the preload eliminates rattle of linear bearing 30 (i.e. ball 32) that supports the movable member including one of magnet 60 and positioning magnet 45B (for example, movable member 50 including magnet 60), and restricts the movement of the movable member in the short direction, and the direction in which magnet 60 and positioning magnet 45B are opposite to each other.

According to the present embodiment, it is possible to achieve effects similar to those of the components having the same names in <Effect 1> to <Effect 7>.

Embodiment 4

Figure 16:
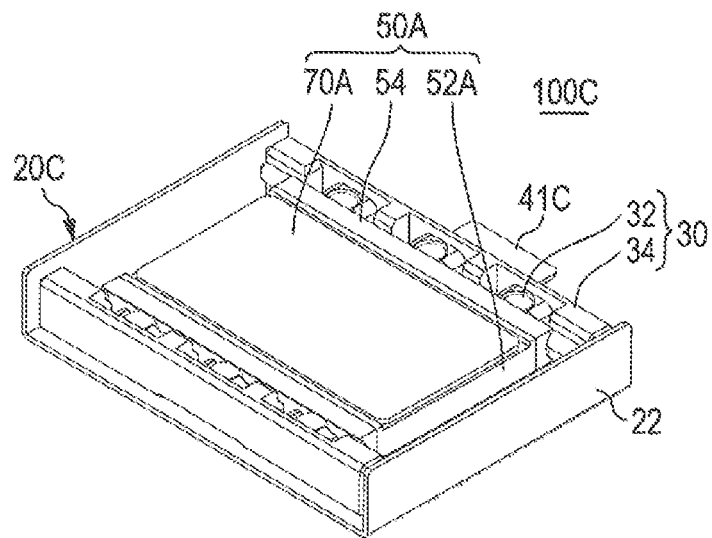
FIG. 16 is a perspective view illustrating an internal configuration of a vibration actuator according to Embodiment 4 of the present invention.
Figure 17:
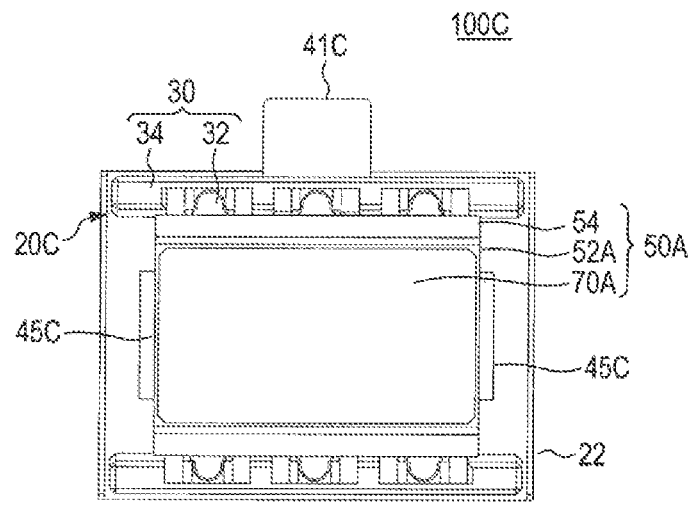
FIG. 17 is a plan view illustrating an internal configuration of the vibration actuator.
Figure 18:
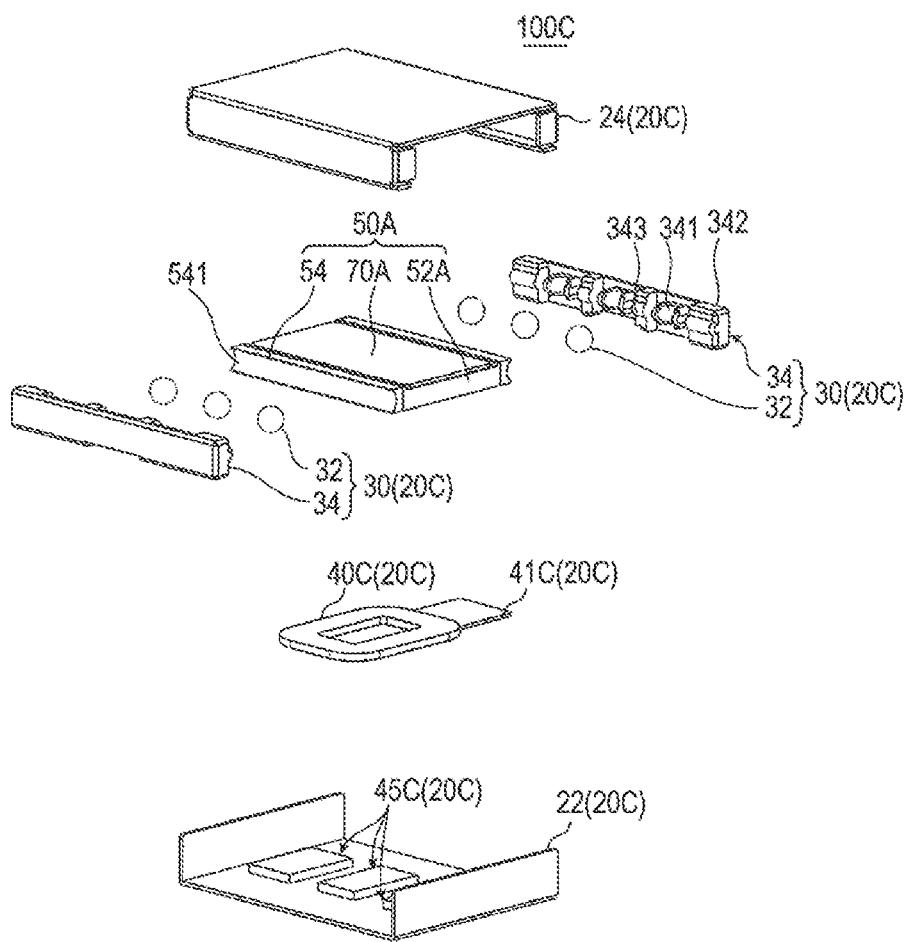
FIG. 18 is an exploded perspective view of the vibration actuator.
Figure 19:
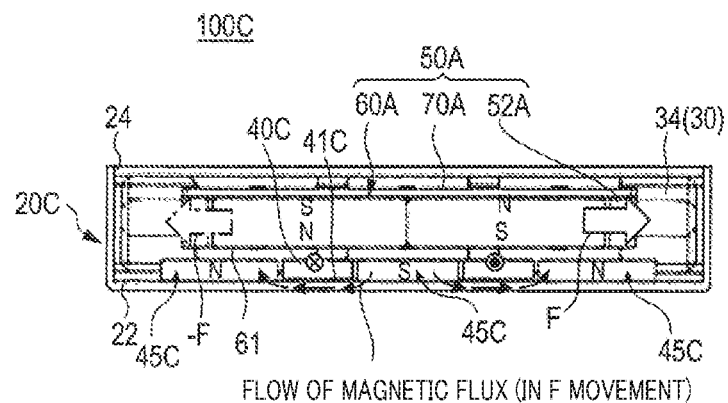
FIG. 19 illustrates movement of a movable member of the vibration actuator.

FIG. 16 is a perspective view illustrating an internal configuration of a vibration actuator according to Embodiment 4 of the present invention, FIG. 17 is a plan view illustrating an internal configuration of the vibration actuator, and FIG. 18 is an exploded perspective view of the vibration actuator. In addition, FIG. 19 illustrates movement of a movable member of the vibration actuator.

Vibration actuator 100C illustrated in FIG. 16 to FIG. 19 has a configuration in which a core of a magnetic substance (in this case, 3-pole core 45C) is provided at the center of the coil and a peripheral portion of the coil in place of positioning magnet 45 in the configuration of vibration actuator 100A. Vibration actuator 100C includes fixing body 20C and movable member 50A, and movable member 50A is movably and elastically supported by fixing body 20C with a magnetic spring of a magnetic attractive force generated by magnet 60A and 3-pole core 45C. It is to be noted that regarding the components of vibration actuator 100C, the components same as those of vibration actuator 100 or 100A are denoted with the same reference numerals and description thereof is omitted, and the components having configurations same as those of vibration actuator 100 or 100A except in their shapes are denoted with the same names Vibration actuator 100C has an external appearance similar to that of vibration actuator 100 illustrated in FIG. 1.

Fixing body 20C of vibration actuator 100C includes, in addition to cover 22, case 24, and linear bearing 30, 3-pole core 45C and coil 40C connected with power supply part (in this case, a board) 41C.

Fixing body 20C is formed similarly to fixing body 20, and 3-pole core 45C and coil 40C disposed opposite to magnet 60A of movable member 50A are provided at a center portion of the bottom plate of cover 22.

3-pole core 45C is composed of a magnetic substance, and is disposed at the core part (in the center portion) of coil 40C and at peripheral parts (in this case, outside the end side portions of coil 40C opposite to each other in the longitudinal direction) of coil 40C.

3-pole core 45C is fixed on the inner surface of cover 22 of a magnetic substance so as to sandwich coil 40C, and 3-pole core 45C forms E-shaped core having an E-shaped cross sectional shape together with cover 22. In this manner, fixing body 20C is provided with the center core of 3-pole core 45C projected from cover 22 in the center portion of coil 40C. In addition, the outer cores of 3-pole core 45C of a magnetic substance are provided at a position on cover 22 and outside in the longitudinal direction (one direction) of coil 40C. The outer cores of 3-pole core 45C form a magnetic spring that elastically supports movable member 50A together with cover 22, the center core and magnet 60A.

Coil 40C is disposed so as to be wound around the center core. Projecting end surfaces of 3-pole core 45C are substantially flush with the surface of coil 40C on magnet 60A side.

As illustrated in FIG. 19, in the non-driving state, the center core of 3-pole core 45C is disposed such that the boundary between the magnetic pole N and the magnetic pole S of opposing surface 61 of magnet 60A is located above the center of the center core in the longitudinal direction (movement direction). In addition, in the non-driving state, cores 45C separately disposed on both sides of the center core in the longitudinal direction are disposed such that the side portions of magnet 60A opposite to each other in the longitudinal direction are located above respective centers of the above-mentioned cores 45C in the longitudinal direction thereof.

In the non-driving state, a magnetic attractive force is generated by 3-pole core 45C and magnet 60A of movable member 50A, and with this magnetic attractive force, 3-pole core 45C and magnet 60A are attracted to each other. With this configuration, a preload is exerted between linear bearing 30 and roll contact part 54. With this preload, rattle between movable member 50A and linear bearing 30 is eliminated, and movable member 50A is positioned so as to move only in the movable direction of movable member 50A (positioning of movable member 50A). In the non-driving state, movable member 50A is elastically held by the magnetic spring of 3-pole core 45C and magnet 60A such that movable member 50A is movable in the longitudinal direction.

In 3-pole core 45C, when coil 40C is fed with power, the center core of coil 40C, and the cores sandwiching the center core in the longitudinal direction are excited to respective polarities. At this time, the center core and the side cores are excited in different magnetic poles.

In addition, in vibration actuator 100C, movable member 50A vibrates back and forth with the electromagnetic operation using magnet 60A and coil 40C. With the magnetic attractive force generated by feeding power to coil 40C opposite to magnet 60A, movable member 50A vibrates back and forth in the longitudinal direction while being supported by linear bearing 30.

For example, in vibration actuator 100C, when power is supplied to coil 40C with opposing surface 61 of magnet 60A set to N pole and S pole arranged in the longitudinal direction, the magnetic flux flow is generated as illustrated in FIG. 19, and a Lorentz force is generated. 3-pole core 45C is excited such that the center core is S pole, and the side cores sandwiching the center core is N pole. In addition, the magnetic attractive force generated by coil 40C acts on movable member 50A, and a thrust in the F-direction is exerted on movable member 50A so as to linearly move movable member 50A in the F-direction. When coil 40C is supplied with an opposite current after movable member 50A is moved in the F-direction, a thrust in the −F-direction opposite to the F-direction is exerted on movable member 50A.

In vibration actuator 100C, when an alternating current having a frequency substantially equal to resonance frequency $f_r$ of movable member 50A is supplied to coil 40C by power supply part 41C to excite coil 40C, movable member 50A vibrates back and forth in the F direction and the −F-direction along the longitudinal direction with respect to a position that serves as the reference position (in this case, the position where the center of the center core of 3-pole core 45C overlap the boundary between the N pole the S pole of magnet 60A) in the above-mentioned manner. It is to be noted that this driving operation is similar to that of vibration actuator 100 of Embodiment 1 that is achieved based on Expressions (1), (2) and (3).

According to the present embodiment, it is possible to achieve effects similar to those of the components having the same names in <Effect 1> and <Effect 3> to <Effect 6>.

<Effect 7-1>

Further, with the magnetic attractive force between magnet 60A and 3-pole core 45C, a preload is applied on movable member 50A. That is, in the non-driving state, with a preload exerted on ball 32 of linear bearing 30 that supports movable member 50A, clearance between ball 32 and rail 34 or roll contact part 54 is eliminated, and backlash noise due to the clearance is not generated, and thus, noise reduction in movable member 50A can be achieved. In addition, movable member 50A can vibrate back and forth with a good lateral balance through linear bearing 30.

In particular, in vibration actuator 100C, the three cores (3-pole core 45C) serve as the magnetic pole, and the efficiency of the magnetic circuit functioning as the driving source including magnet 60A, yoke 70A, coil 40C and cover 22 is increased, and accordingly, movable member 50A can be more efficiently driven than vibration actuator 100A.

Embodiment 5

Figure 20:
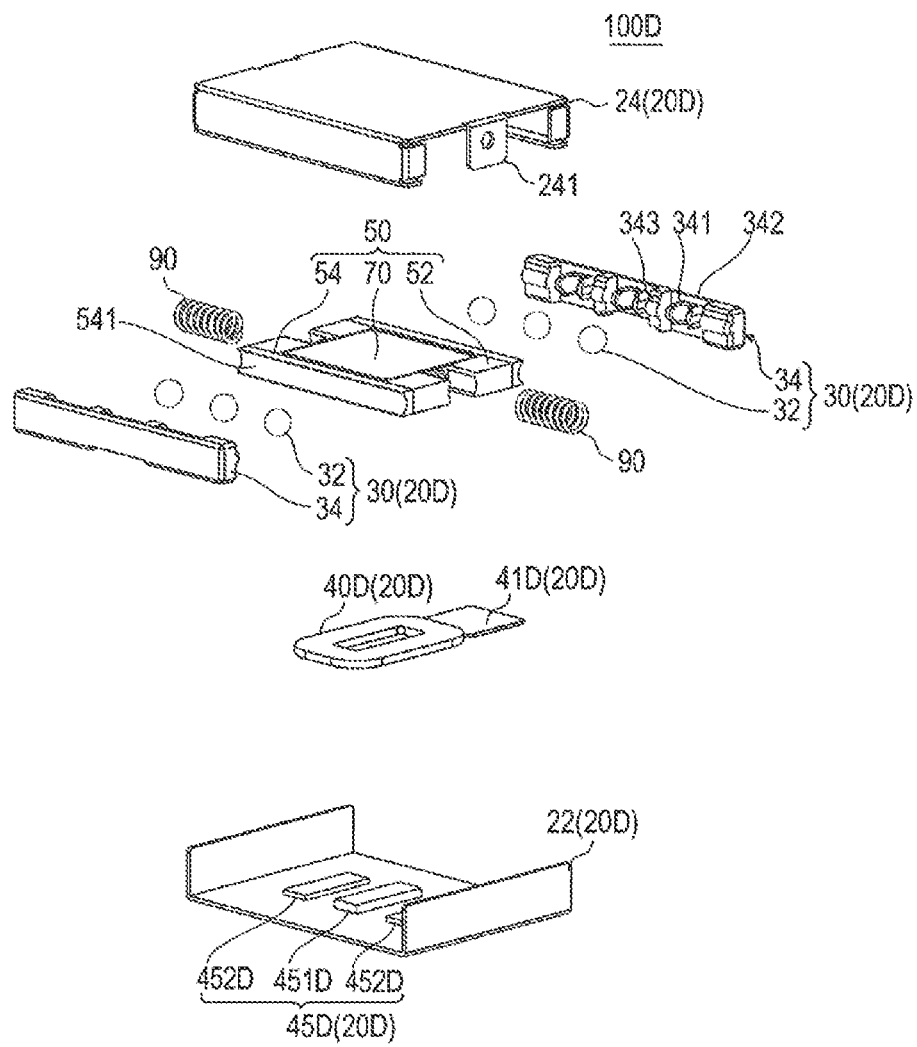
FIG. 20 is an exploded perspective view of a vibration actuator according to Embodiment 5 of the present invention.
Figure 21:
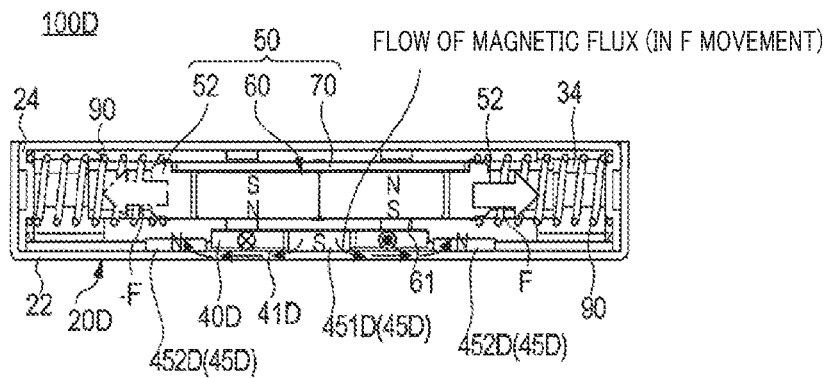
FIG. 21 illustrates movement of a movable member of the vibration actuator.

FIG. 20 is an exploded perspective view of a vibration actuator according to Embodiment 5 of the present invention, and FIG. 21 illustrates movement of a movable member of the vibration actuator.

Vibration actuator 100D illustrated in FIG. 20 and FIG. 21 has a configuration in which core 45D of vibration actuator 100C is used in the configuration of vibration actuator 100. In vibration actuator 100D, movable member 50 is elastically supported by metal spring 90 that is a cylindrical coil spring, and a magnetic spring of a magnetic attractive force generated by magnet 60 and core 45D. It is to be noted that regarding the components of vibration actuator 100D, the components same as those of vibration actuator 100 are denoted with the same reference numerals and description thereof is omitted, and the components having configurations same as those of vibration actuator 100 except in their shapes are denoted with the same names.

Vibration actuator 100D illustrated in FIG. 20 and FIG. 21 has an external appearance similar to that of vibration actuator 100 illustrated in FIG. 1. Vibration actuator 100D includes fixing body 20D, movable member 50, and metal spring 90, and elastically and movably supports movable member 50 by fixing body 20D through metal spring (machine spring) 90.

Fixing body 20D includes cover 22 and case 24 that form a flat-plate shaped housing, linear bearing 30, coil 40D connected with power supply part (in this case, a board) 41D, and core 45D.

Unlike fixing body 20, fixing body 20D is provided with, at a center portion of the bottom plate of cover 22, core 45D facing magnet 60 of movable member 50 and disposed at the center of coil 40D and peripheral portions of coil 40D.

Core 45D is composed of a magnetic substance, and is a 3-pole core in this case. Core 45D includes center core 451D disposed at the core part (in the center portion) of coil 40D, and outer core 452D disposed at peripheral parts (in this case, outside the end side portions of coil 40D opposite to each other in the longitudinal direction) of coil 40D.

Core 45D is projected on the inner surface of cover 22 of a magnetic substance, and center core 451D and outer cores 452D form an E-shaped core having an E-shaped cross sectional shape together with cover 22.

Coil 40D is disposed around center core 451D, and outer cores 452D are disposed such that coil 40D is sandwiched between center core 451D and outer cores 452D. Outer core 452D is lower than center core 451D.

The positional relationship between core 45D and magnet 60 is similar to that of 3-pole core 45C and magnet 60A (see FIG. 19) of vibration actuator 100C. That is, in the non-driving state, center core 451D is disposed such that the boundary between the magnetic pole N and the magnetic pole S of opposing surface 61 of magnet 60 is located above the center of center core 451D in the longitudinal direction thereof (movement direction). In addition, in the non-driving state, outer cores 452D are disposed such that the end portions of magnet 60 opposite to each other in the longitudinal direction are located above the centers of respective outer cores 452D in the longitudinal direction.

In the non-driving state, a magnetic attractive force is generated between core 45D and magnet 60 of movable member 50, and with this magnetic attractive force, core 45D and magnet 60 are attracted to each other. With this configuration, a preload is exerted between linear bearing 30 and roll contact part 54. With this preload, rattle between movable member 50 and linear bearing 30 is eliminated, and movable member 50 is elastically held and positioned by the magnetic spring together with metal spring 90 in the movable direction of movable member 50 (positioning of movable member 50). In the non-driving state, movable member 50 is supported movably in the longitudinal direction in the state where a preload is applied thereto by core 45D and magnet 60.

When power is fed to coil 40D, center core 451D and outer core 452D of coil 40D are excited to respective polarities. At this time, center core 451D and outer core 452D are excited in different polarities. In this manner, fixing body 20C is provided with center core 451D projected from cover 22 in the center portion of coil 40D. In addition, outer cores 452D of a magnetic substance are provided at a position on cover 22 and outside coil 40D in the longitudinal direction (one direction). Together with cover 22 and magnet 60, 3-pole core 45D forms a magnetic spring that elastically supports movable member 50.

In addition, in vibration actuator 100D, movable member 50 vibrates back and forth with the electromagnetic operation using magnet 60 and coil 40D. With a Lorentz force generated by feeding power to coil 40D opposite to magnet 60, movable member 50 vibrates back and forth in the longitudinal direction while being supported by linear bearing 30.

For example, as illustrated in FIG. 21, in vibration actuator 100D, when opposing surface 61 of magnet 60 is set to N pole and S pole arranged in the longitudinal direction, the magnetic flux flow (in F movement) illustrated in FIG. 21 is generated. With a thrust in the F-direction resulting from the magnetic attractive force generated by magnet 60 and core 45D (center core 451D excited to S pole, and center outer core 452D excited to N pole) applied thereto, magnet 60, that is, movable member 50, is driven in the F-direction. In addition, when an opposite current is supplied to coil 40D, the magnetic flux flow becomes opposite to that of the F movement direction, and magnet 60 is returned to the reference position at the time of switching, and, a thrust in the −F-direction resulting from the generated magnetic attractive force is exerted on magnet 60 such that movable member 50 is driven in the −F-direction opposite to the F-direction. The thrust direction of the current flow is switched by supplying an alternating current to coil 40D such that movable member 50 is switched between the F-direction movement and the −F-direction movement with returning to the reference position therebetween. It is to be noted that, as with other embodiments, the returning to the reference position is performed with the reactive force of the magnetic spring, the machine spring, the positioning magnet and the like.

In vibration actuator 100D, when an alternating current having a frequency substantially equal to resonance frequency $f_r$ of movable member 50 is supplied to coil 40D through power supply part 41D, movable member 50 vibrates back and forth in the F direction and the −F-direction along the longitudinal direction with respect to a position that serves as the reference position (in this case, a position where the center of core 451D in the longitudinal direction overlaps the center of N pole S pole of magnet 60) in the above-mentioned manner. It is to be noted that this driving operation is similar to that of vibration actuator 100 of Embodiment 1 that is achieved based on Expressions (1), (2) and (3).

With this configuration, according to the present embodiment, it is possible to achieve effects similar to those of the components having the same names in <Effect 1> to <Effect 7> while achieving the following effects.

That is, in vibration actuator 100D, movable member 50 is elastically supported by metal spring 90 as a machine spring disposed in the movable direction together with the magnetic spring of magnet 60 and core 45D.

With this configuration, by using the machine spring together with the magnetic spring, it is possible to readily set an optimum spring constant for movably supporting movable member 50 while reducing the negative influence of the metal fatigue of metal spring 90 in designing the structure for supporting spring movable member 50, whereby the degrees of freedom in design of can be increased. For example, when the spring constant is insufficient in the case where a spring-mass structure is configured with only a magnetic spring, a desired resonance frequency can be set by changing the spring constant of the magnetic spring. In the non-driving state in particular, rattle relating to ball 32 can be prevented so as to reduce noise with the preload exerted on linear bearing 30.

Embodiment 6

Figure 22:
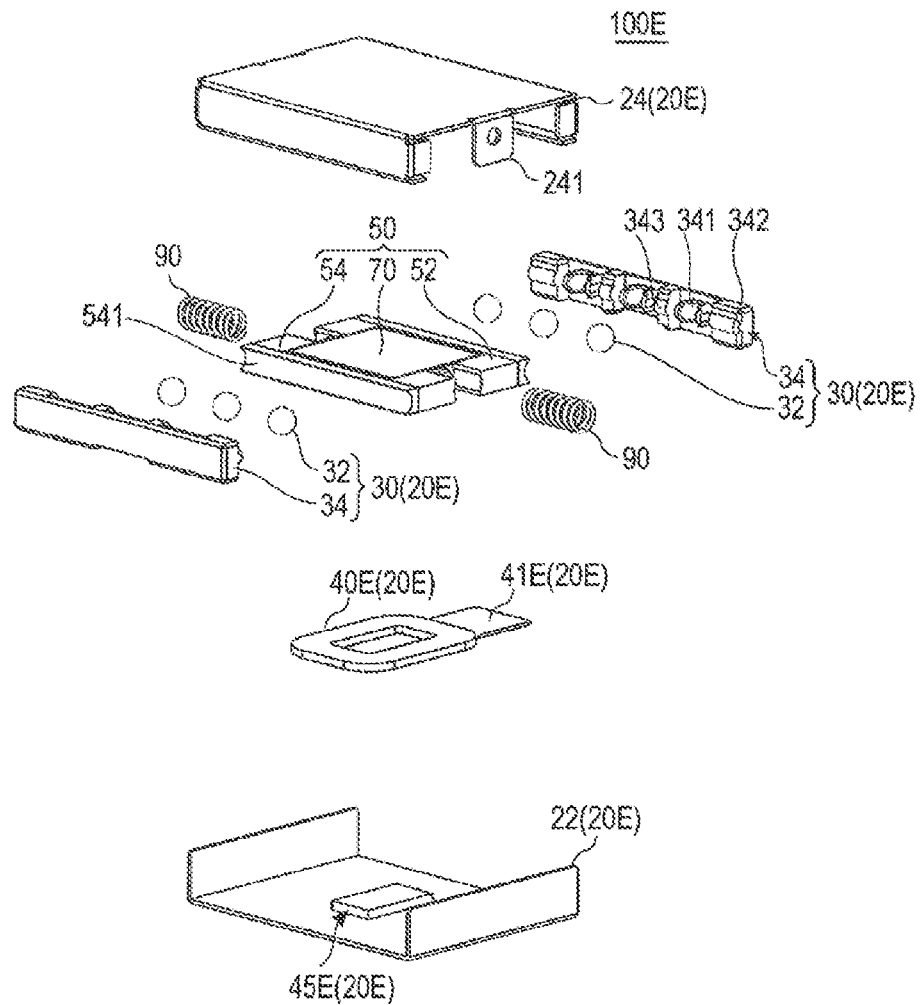
FIG. 22 is an exploded perspective view illustrating a configuration of a vibration actuator according to Embodiment 6 of the present invention.
Figure 23:
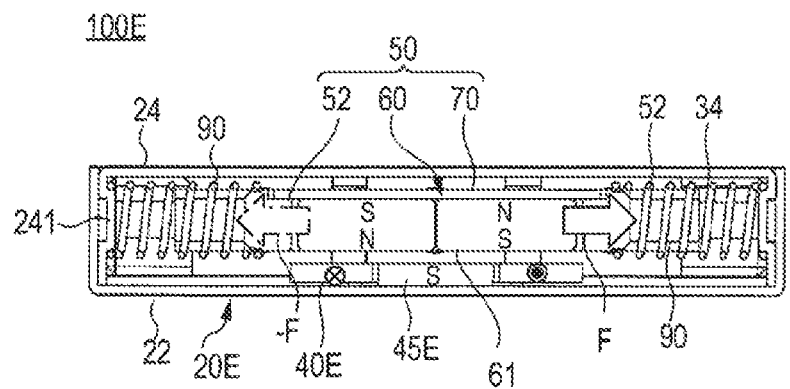
FIG. 23 illustrates movement of a movable member of the vibration actuator.

FIG. 22 is an exploded perspective view illustrating a configuration of a vibration actuator according to Embodiment 6 of the present invention, and FIG. 23 illustrates movement of a movable member of the vibration actuator. Vibration actuator 100E illustrated in FIG. 22 and FIG. 23 has a configuration in which unipolar core (single core) 45E is provided in place of 3-pole core 45D in the configuration of vibration actuator 100D.

Vibration actuator 100E has a configuration similar to that of vibration actuator 100D, and the components same as those of vibration actuator 100D are denoted with the same reference numerals and description thereof is omitted, and, the components having configurations same as those of vibration actuator 100D except in their shapes are denoted with the same names Vibration actuator 100E illustrated in FIG. 22 and FIG. 23 has a configuration in which core 45D of fixing body 20D is unipolar core 45E in place of tripolar core 45D, and this core 45E is disposed at the core part of coil 40D disposed at a center portion of the bottom plate of cover 22 in the configuration of vibration actuator 100D. In FIG. 22 and FIG. 23, core 45E is disposed at the core part of coil 40E disposed at a center portion of the bottom plate of cover 22 of fixing body 20E, that is, core 45E is disposed at in coil 40E. It is to be noted that coil 40E is connected to power supply part 41E similar to power supply part 41D of coil 40D.

In vibration actuator 100E, a magnetic attractive force generated by magnet 60 in which N pole and S pole are disposed in movable member 50, coil 40E disposed opposite to magnet 60, and core 45E disposed at the core part (coil center portion) of coil 40E is used to form a magnetic spring of a magnetic attractive force of magnet 60 and core 45E. With this magnetic spring, movable member 50 is movably and elastically supported.

With vibration actuator 100E, effects similar to the effects of vibration actuator 100D can be obtained. Additionally, with the center core serving as the magnetic pole, the efficiency of the magnetic circuit is increased, and thus movable member 50 can be linearly vibrated back and forth with high efficiency.

Embodiment 7

Figure 24:
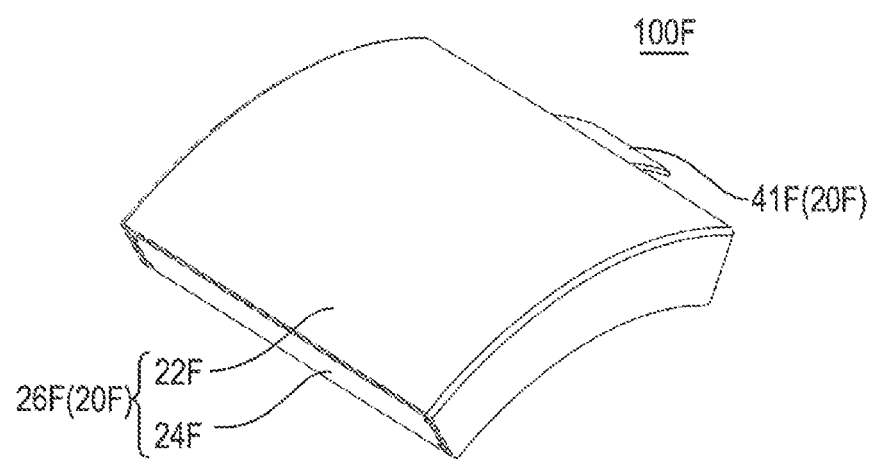
FIG. 24 illustrates an external configuration of a vibration actuator according to Embodiment 7 of the present invention.
Figure 25:
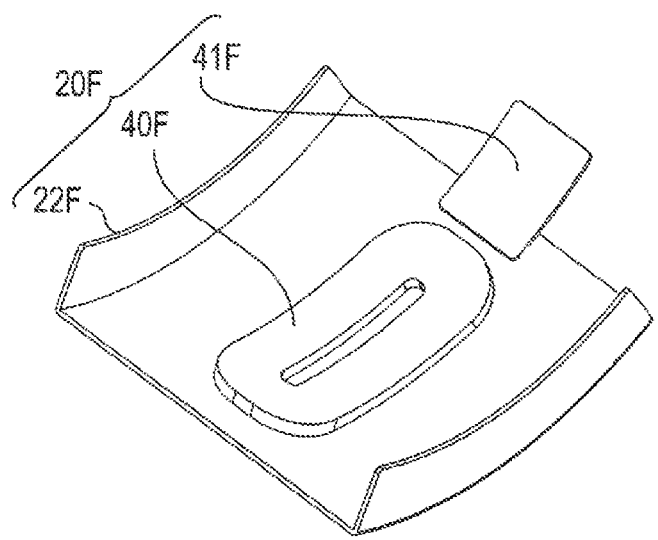
FIG. 25 is a perspective view of a cover dismounted from a case of the vibration actuator as viewed from the rear surface side.
Figure 26:
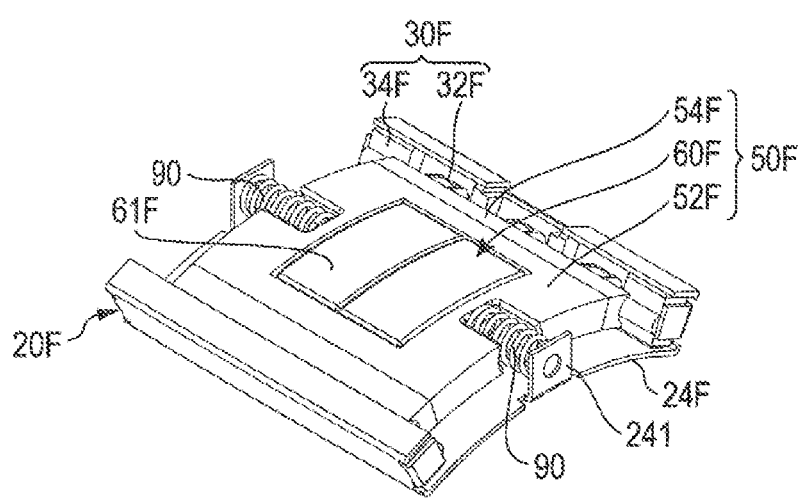
FIG. 26 is a perspective view illustrating a configuration of a main part on the case side of the vibration actuator from which the cover is dismounted.
Figure 27:
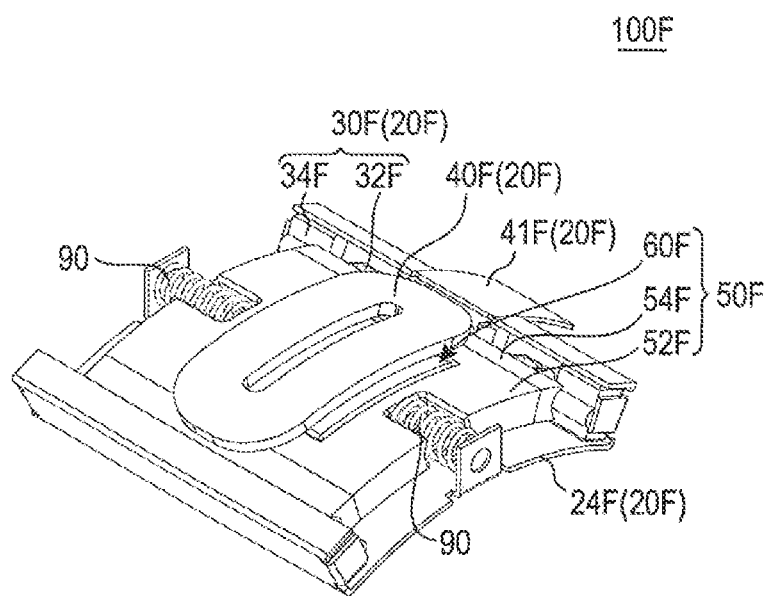
FIG. 27 is a perspective view illustrating a positional relationship between a magnet and a coil in the vibration actuator.
Figure 28:
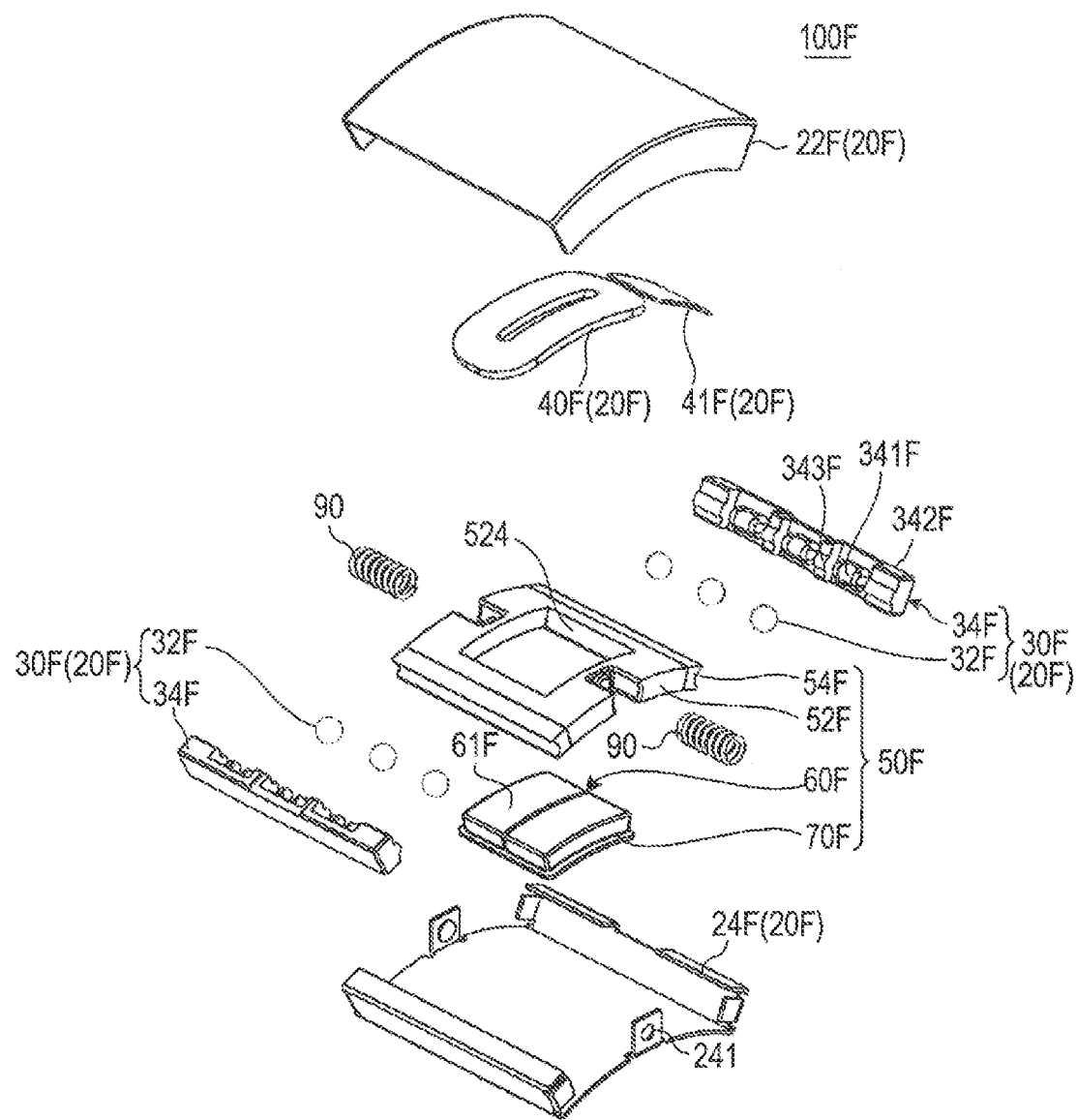
FIG. 28 is an exploded perspective view of the vibration actuator.
Figure 29:
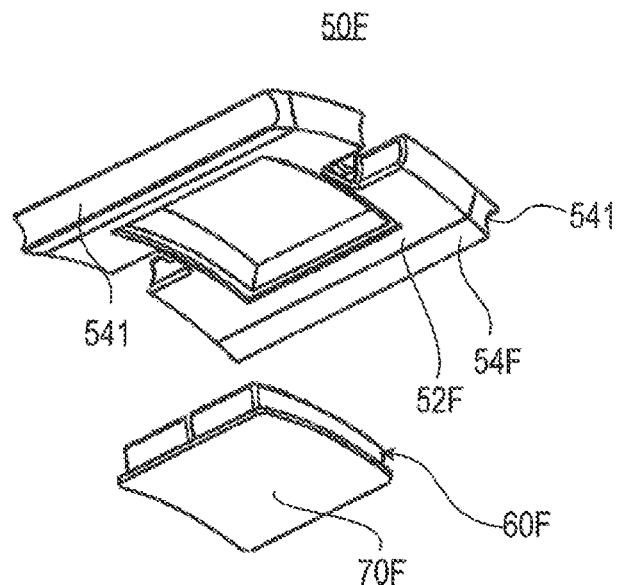
FIG. 29 is a perspective view of a movable member illustrated in FIG. 28 as viewed from the rear surface side.
Figure 30:
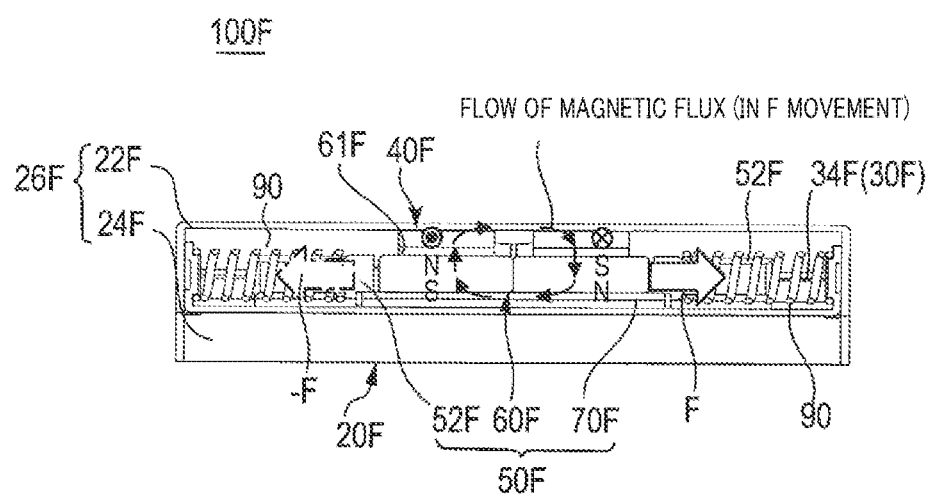
FIG. 30 illustrates movement of the movable member of the vibration actuator according to Embodiment 7 of the present invention.

FIG. 24 illustrates an external configuration of a vibration actuator according to Embodiment 7 of the present invention, and FIG. 25 is a perspective view of a cover dismounted from a case of the vibration actuator as viewed from the rear surface side. In addition, FIG. 26 is a perspective view illustrating a configuration of a main part on the case side of the vibration actuator from which the cover is dismounted, FIG. 27 is a perspective view illustrating a positional relationship between a magnet and a coil in the vibration actuator, and FIG. 28 is an exploded perspective view of the vibration actuator. FIG. 29 is a perspective view of the movable member illustrated in FIG. 28 as viewed from the rear surface side, and FIG. 30 illustrates movement of the movable member of the vibration actuator according to Embodiment 7 of the present invention.

Vibration actuator 100F of Embodiment 7 is a vibration actuator having a flat external shape obtained by bending the external shape of vibration actuator 100 of Embodiment 1. The components of vibration actuator 100F having the names same as those of vibration actuator 100 are different from the corresponding components of vibration actuator 100 only in their shapes, and have functions similar to those of the corresponding components of vibration actuator 100. Accordingly, below, the same components are denoted with the same names and reference numerals and the description thereof are omitted, while the components that are different only in their shapes are denoted with the same names.

Vibration actuator 100F illustrated in FIG. 24 to FIG. 28 has a curved flat shape. In this case, vibration actuator 100F is formed in a flat plate shape having an arcuate cross-sectional shape (hereinafter referred to as "arcuate flat plate shape"). Vibration actuator 100F includes fixing body 20F including housing 26F having an arcuate flat plate shape and composed of case 24F and cover 22F, movable member 50F that linearly vibrates back and forth with respect to fixing body 20F in housing 26F (see FIG. 24), and metal spring 90.

Fixing body 20F includes, in housing 26F, linear bearing 30F, and coil 40F connected with power supply part (in this case, a board) 41F. Movable member 50F is disposed in housing 26F, and includes magnet 60F, magnet holding part 52F, roll contact part 54F, and yoke 70F.

Housing 26F includes a hollow part defined with cover 22F and case 24F. Linear bearing 30F, coil 40F, metal spring 90 and movable member 50F are disposed in the hollow part. As illustrated in FIG. 25, cover 22F includes end wall parts raised from end sides facing each other in the longitudinal direction (in this case, the vibration direction of movable member 50F) of the upper plate that is the curved surface serving as the top surface of housing 26F (see FIG. 24). Coil 40F is fixed at an approximate center portion of the upper plate of cover 22F such that the winding axis direction thereof is the thickness direction (in the drawing, the vertical direction).

Coil 40F is formed in a shape of a curved plate (in this case, an arcuate plate), and is fixed along the curved surface of the upper plate of cover 22. In the non-driving state, coil 40F is opposite to magnet 60F of movable member 50F in the direction orthogonal to the longitudinal direction (movement direction) at a position where their centers overlap (see FIGS. 27 and 30).

Coil 40F is connected with power supply part 41F disposed on cover 22F side. Power supply part 41F is a board for supplying power to coil 40F, which is formed similarly to power supply part 41F and partially exposed from housing 26F.

In case 24F, movable member 50F separated from coil 40F in the thickness direction, metal spring 90 that sandwiches movable member 50F in the longitudinal direction such that movable member 50F is movable in the movement direction, and linear bearing 30F are disposed.

Case 24F includes a bottom plate having a rectangular shape which is an arcuate shape in cross-section, upright pieces 241 raised from end side portions extending in the short direction of the outer periphery of the bottom plate, and recesses provided at the side portions extending in the longitudinal direction of the outer periphery of the bottom plate such that that the recesses open to face each other.

As with vibration actuator 100, movable member 50F is elastically supported at upright piece 241 of case 24F through metal spring 90 composed of a cylindrical coil spring such that movable member 50F is movable in the longitudinal direction above the bottom plate.

Linear bearing 30F is fixed in the recess of case 24F. It is to be noted that, regarding cover 22F and case 24F, at least at cover 22F, where coil 40F is attached, is desirably made of a metal material of a magnetic substance. When cover 22F is made of a metal material together with case 24F, cover 22F functions as an electromagnetic shield.

Linear bearings 30F are disposed so as to sandwich movable member 50F and metal spring 90 in the short direction, and are fixed in the recesses of the side portions extending in the longitudinal direction of case 24F.

As with linear bearing 30, linear bearing 30F supports movable member 50F such that movable member 50F is movable with respect to fixing body 20F in the longitudinal direction, that is, in one linear direction.

As illustrated in FIG. 28, linear bearing 30F includes ball 32F, and rail 34F that supports ball 32F such that ball 32F can roll. In addition, rail 34F includes holder part 341F that holds ball 32F such that ball 32F freely rolls, long rail main body 342F provided with holder part 341F, and projected wall part 343F.

Linear bearing 30F is different from linear bearing 30 only in the shape of rail 34F, and therefore other configurations and functions of linear bearing 30F similar to those of linear bearing 30 are denoted with the same names so that descriptions thereof are omitted. While each linear bearing 30F includes three balls 32F on both sides of movable member 50F, the present invention is not limited to this as long as linear bearing 30F on one side includes at least one ball 32F, and linear bearing 30F on the other side includes at least two balls 32F. As long as linear bearing 30F supports movable member 50F such that movable member 50F is movable in the longitudinal direction, linear bearing 30F may have a configuration in which three or more balls 32F are provided in the entire linear bearing 30F in the longitudinal direction such that balls 32F can roll. As illustrated in FIG. 26 and FIG. 27, movable member 50F is disposed between linear bearings 30F through linear bearing 30F such that movable member 50F is movable in the longitudinal direction.

Movable member 50F is formed in a flat plate shape having an arcuate cross-sectional shape matching the shapes of case 24F and cover 22F. As with movable member 50, movable member 50F has a configuration in which magnet 60F having an arcuate flat plate shape is fitted in opening 524 inside magnet holding part 52F having an arcuate flat frame shape.

Magnet 60F has an arcuate flat plate shape having an arcuate cross-sectional shape. Yoke 70F is attached on the surface of magnet 60F on case 24F side, and yoke 70F is engaged with the edge of opening 524 of magnet holding part 52F at the outer edge.

As with magnet holding part 52, magnet holding part 52F is provided with roll contact part 54F at the side portions along in the longitudinal direction (movement direction).

As with roll contact part 54, roll contact part 54F is movable in the longitudinal direction (movement direction) through ball 32F with respect to rail 34F while making point contact with ball 32F of linear bearing 30F.

Vibration actuator 100F is formed in a curved flat shape, and to be more specific, vibration actuator 100F includes housing 26F having an arcuate flat plate shape having an arcuate cross-sectional shape. In vibration actuator 100F, magnet 60F faces coil 40F of fixing body 20F at opposing surface 61F in which N pole and S pole are arranged, and movable member 50F including magnet 60F is elastically supported by metal spring 90 as a machine spring disposed in the movable direction.

When coil 40F is excited with power supplied from power supply part 41F, movable member 50F vibrates (moves)

back and forth in the longitudinal direction, that is, in a direction orthogonal to the circumferential direction.

For example, when power is fed to coil 40F in the magnetic flux flow illustrated in FIG. 30 (a flow of F magnetic flux (in F movement)), since the current flowing through coil 40F is set be orthogonal to the magnetic flux from magnet 60F, a Lorentz force generated therein generates a force in coil 40F, and operation reaction force is generated in movable member 50F, thereby driving the member in the F-direction. In addition, when an opposite current is supplied to coil 40F, magnet 60F is returned to the reference position at the time of switching, and a force is generated in coil 40F by a Lorentz force, and, an operation reaction force is generated in movable member 50F, thereby driving movable member 50F in the F-direction. In addition, when an opposite current is supplied to coil 40F, magnet 60F is returned to the reference position at the time of switching, and a force is generated in coil 40F by a Lorentz force, and, an operation reaction force is generated in movable member 50F, thereby driving movable member 50F in the −F-direction opposite to the F-direction.

In vibration actuator 100F, coil 40F is excited with an alternating current provided to coil 40F from power supply part 41F, and a magnetic attractive force and a repulsing force with respect to magnet 60F on movable member 50F side are effectively generated. With this configuration, a thrust of the F-direction and a thrust of the −F-direction are applied to magnet 60F with respect to a position that serves as a driving reference position (in this case, a position where the center of magnet 60F at the boundary between N pole surface and the S pole surface on coil 40F side overlaps the center of coil 40 just above coil 40F). With this configuration, magnet 60F vibrates back and forth in the F-direction and the −F-direction along the longitudinal direction. That is, movable member 50F is guided by linear bearing 30F to vibrate back and forth with respect to fixing body 20F in a direction along the N pole surface and the S pole surface facing coil 40F in magnet 60F. It is to be noted that the driving operation of vibration actuator 100F of the present embodiment is achieved based on Expressions (1) to (3). It is to be noted that cover 22F may be made of a magnetic substance as with cover 22F. In addition, as with magnet holding part 52, magnet holding part 52F may be formed with a high-specific gravity material such as tungsten having a specific gravity higher than a material such as an SECC.

Additionally, vibration actuator 100F can provide the following effects in addition to <Effect 1> to <Effect 5>.
<Effect 8>

In the case where a conventional planar-shaped actuator or a conventional cylindrical-shaped actuator is attached to a ring-shaped device (ex. D15 to 25 mm), the position for putting the actuator in the device is restricted by other portions (such as a finger), and therefore cannot be freely set. As a ring, the orientation is restricted, and therefore the mounting position cannot be freely set. Meanwhile, when the width of the actuator in the form of the planar shape is increased as it is to increase the output of the actuator, the size of the ring as an end product is increased.

When the actuator has a planar shape, the external side and the skin are distanced, and the area of the contact surface (line contact) with the skin decreases. In addition, since the housing is interposed between the vibration source and the skin, vibration transmission might be reduced.

In contrast, vibration actuator 100F itself has a flat arcuate shape, and therefore the shape of the end product to which vibration actuator 100F is attached can be disposed such that the curved surface having the arcuate shape corresponds to the curve of the peripheral surface of the cylinder. With this configuration, for example, in the case where the end product has a curved surface such as a cylinder, vibration actuator 100F can be put at any position in the cylinder. As a result, in the case of a ring-shaped device for example, a larger intensity of the sensory vibration can be achieved by disposing the device on the skin on the palm side where the density of the machine receptors is high and the surface shape is curved. That is, vibration actuator 100F can be put on a fingertip where the machine receptors are densely present such that the curvature surface, which is the vibration transmission surface and the bottom plate of vibration actuator 100F, makes intimate contact thereto. With this configuration, a large intensity of the sensory vibration can be achieved without changing the external shape.

In addition, in the case where the width is increased to increase the output, the external size of the end product is not sacrificed even with the increased width since the inner peripheral surface is curved in an arch shape. In addition, in the case where the device is put around a finger having a large diameter, a plurality of devices can be put around the finger since the device can be put along the peripheral surface. Further, the bottom plate of vibration actuator 100F is the vibration transmission surface and the entire surface can provide vibration. Therefore, the area of the vibration transmission surface is large, and the distance to the machine receptors of the skin can be reduced, thereby enhancing vibration transmission. In addition, the end product can have a cylindrical shape, and therefore, in a configuration in which the device is put on a finger, the housing size can be reduced and thus reduction in size, weight, and cost can be achieved.

Embodiment 8

Figure 31:
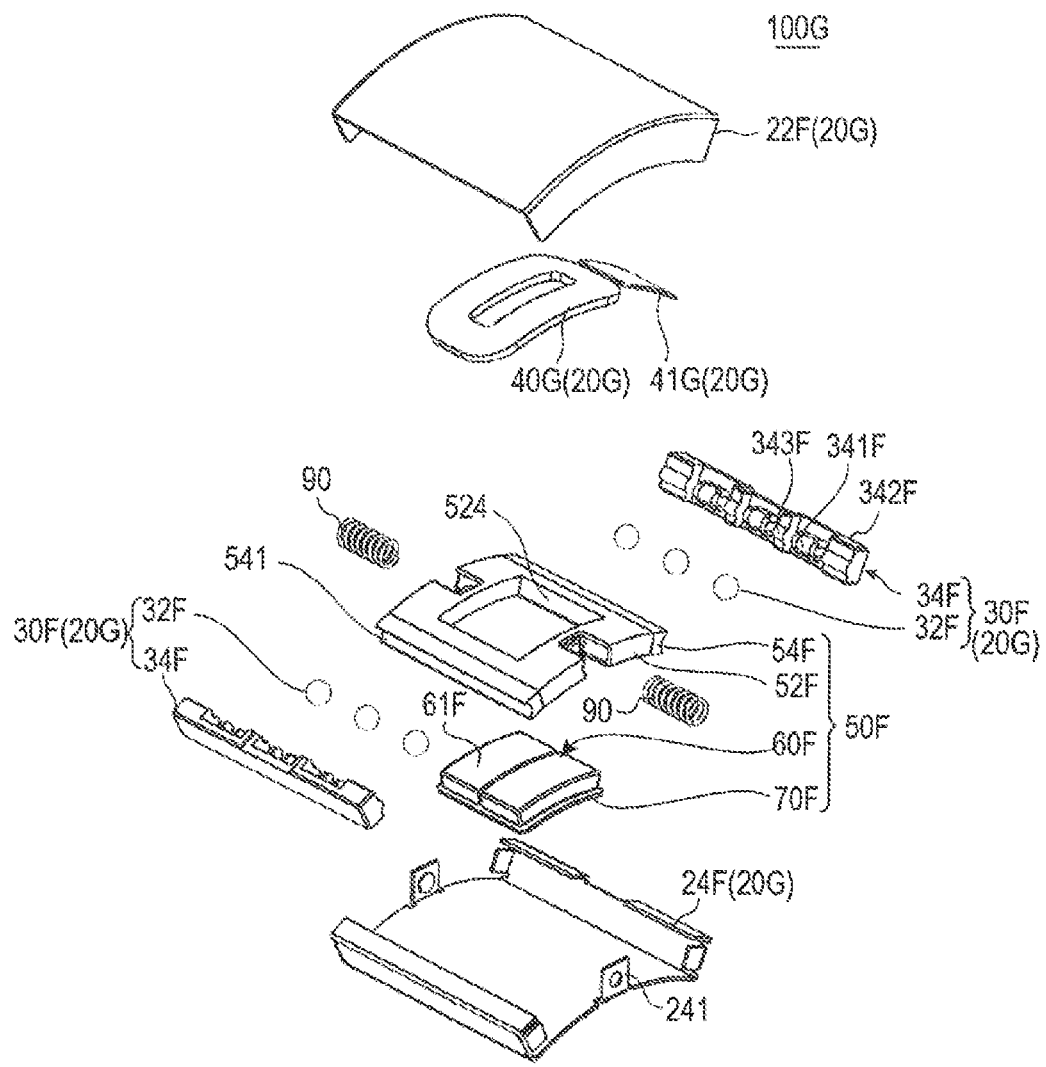
FIG. 31 is an exploded perspective view of a vibration actuator according to Embodiment 8 of the present invention.
Figure 32:
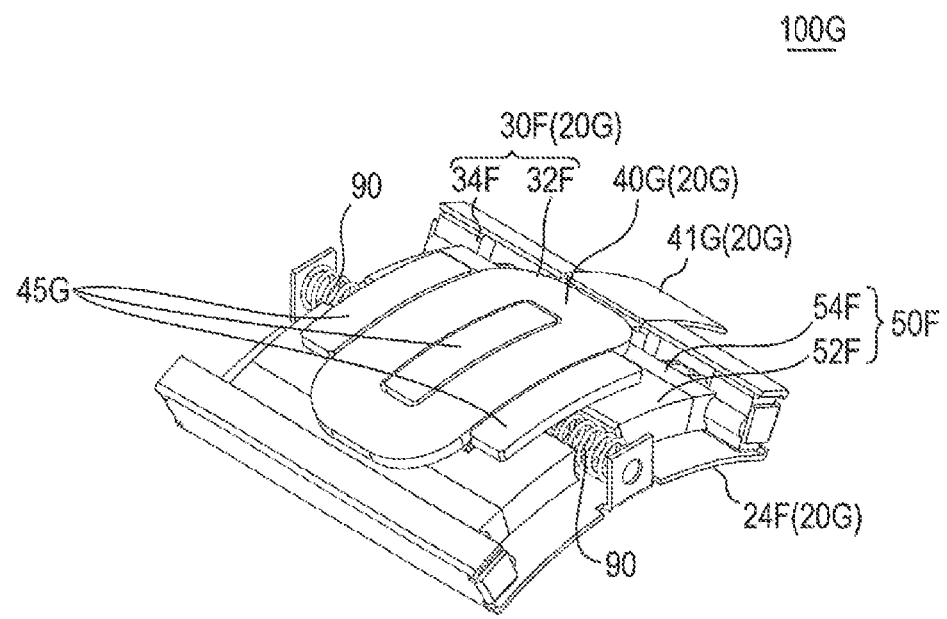
FIG. 32 is a perspective view illustrating a configuration of a main part of the vibration actuator.
Figure 33:
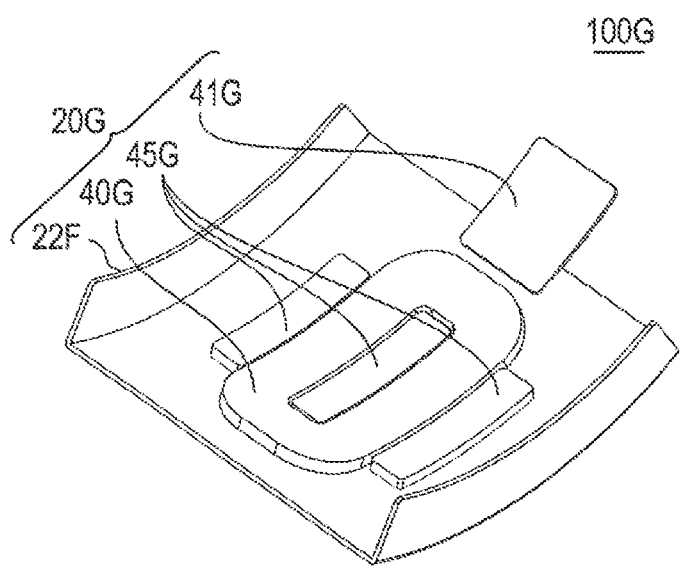
FIG. 33 is a perspective view of a cover dismounted from the case of the vibration actuator as viewed from the rear surface side.
Figure 34:
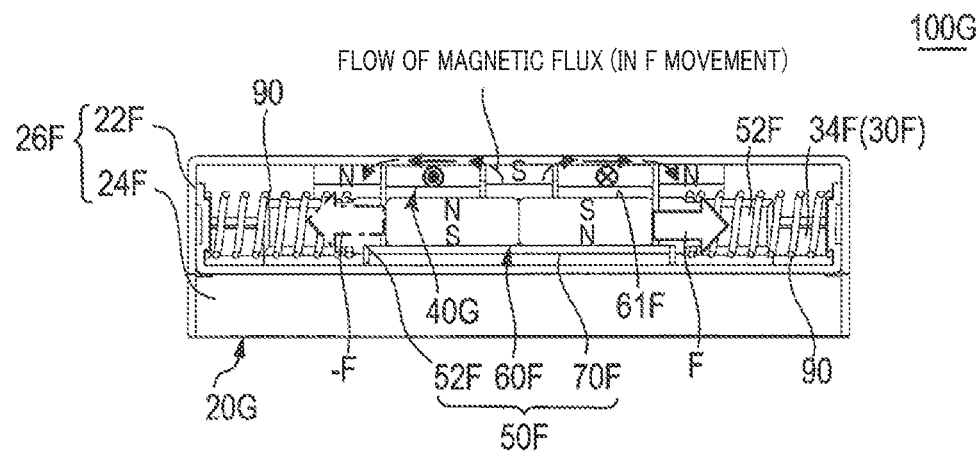
FIG. 34 illustrates movement of a movable member of the vibration actuator according to Embodiment 8 of the present invention.

FIG. 31 is an exploded perspective view of a vibration actuator according to Embodiment 8 of the present invention, FIG. 32 is a perspective view illustrating a configuration of a main part of the vibration actuator, and FIG. 33 is a perspective view of a cover dismounted from a case of the vibration actuator as viewed from the rear surface side. FIG. 34 illustrates movement of a movable member of the vibration actuator according to Embodiment 8 of the present invention.

Vibration actuator 100G of Embodiment 8 is a vibration actuator in which core 45G is provided together with coil 40G on the rear surface of the curved upper plate of cover 22F in the configuration of vibration actuator 100F of Embodiment 7. Since the components of vibration actuator 100G are similar to those of vibration actuator 100F, the components similar to those of vibration actuator 100F are denoted with the same names and same reference numerals and description thereof is omitted, and, the configurations relating to 3-pole core 45G are described.

As with vibration actuator 100F, vibration actuator 100G illustrated in FIG. 31 to FIG. 34 has a curved flat shape. In this case, vibration actuator 100G has a flat plate shape having an arcuate cross-sectional shape (hereinafter referred to as "arcuate flat plate shape"). Vibration actuator 100G includes fixing body 20G, movable member 50F that linearly vibrates back and forth with respect to fixing body 20G (vibration in one direction), and metal spring 90.

Fixing body 20G includes cover 22F, case 24F, linear bearing 30F, coil 40G connected with power supply part (in this case, an FPC board, which is a board similar to power supply part 41F) 41G, and 3-pole core 45G. It is to be noted that vibration actuator 100G includes, as a magnetic circuit, coil 40G, cover 22F, magnet 60F, yoke 70F, and core 45G, and is similar to vibration actuator 100F, and therefore, the description thereof is omitted.

As with vibration actuator 100F, a pair of linear bearings 30F is fixed to housing case 24F, and movable member 50F is elastically supported by upright piece 241 through metal spring 90 between linear bearing 30F. As illustrated in FIG. 33, vibration actuator 100G is provided with 3-pole core 45G similar to 3-pole core 45C of vibration actuator 100C on the rear surface of cover 22F (specifically the upper plate of cover 22F) together with coil 40G.

3-pole cores 45G are magnetic substances, and are disposed at a core part of coil 40G (a center portion), and peripheral parts of coil 40G (outside the end portions opposite to each other in the longitudinal direction of coil 40G). 3-pole cores 45G are fixed on the rear surface of the upper plate of cover 22F of a magnetic substance so as to sandwich coil 40G 3-pole cores 4G form an E-shaped core having an E-shaped cross sectional shape together with cover 22F. It is to be noted that, coil 40G is disposed around the center core of 3-pole core 45G The projecting end of each 3-pole core 45G is substantially flush with the surface of coil 40G on magnet 60F side. It is to be noted that, in 3-pole core 45G, when power is fed to coil 40G, the center core of coil 40G and the cores sandwiching coil 40G in the longitudinal direction are excited so as to have respective polarities. At this time, the center core and the side cores are excited in different magnetic poles.

In vibration actuator 100G, the magnetic flux flow (a flow of F magnetic flux (in F movement)) illustrated in FIG. 34 is generated, for example. With this configuration, with a thrust resulting from the generated magnetic attractive force in the F-direction applied thereto, magnet 60F, that is, movable member 50F, is driven in the F-direction. In addition, when an opposite current is supplied to coil 40G, the magnetic flux flow becomes opposite to that of the F movement direction, and magnet 60F is returned to the reference position at the time of switching, and, a thrust in the –F-direction resulting from the generated magnetic attractive force is exerted on magnet 60F such that movable member 50F is driven in the –F-direction opposite to the F-direction. The thrust direction of the current flow is switched by supplying an alternating current to coil 40G such that movable member 50F is switched between the F-direction movement and the –F-direction movement with returning to the reference position therebetween. It is to be noted that, as with other embodiments, the returning to the reference position is performed with the reactive force of the magnetic spring, the machine spring, the positioning magnet and the like. In addition, the driving operation of vibration actuator 100G of the present embodiment is achieved based on Expressions (1) to (3).

With this configuration, vibration actuator 100G can achieve effects similar to <Effect 1> to <Effect 5>, <Effect 6-1>, and <Effect 7>.

Embodiment 9

Figure 35:
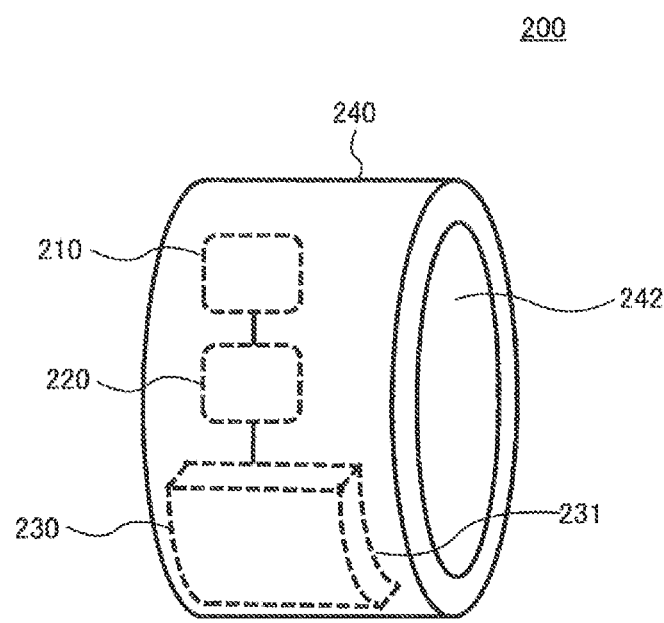
FIG. 35 schematically illustrates a configuration of a main part of a wearable terminal according to Embodiment 9 of the present invention.

FIG. 35 schematically illustrates a configuration of a main part of wearable terminal 200 according to Embodiment 9 of the present invention. Wearable terminal 200 is used by a user by putting on wearable terminal 200. In this case, wearable terminal 200 functions as a so-called wearable input device that provides an incoming notification of a communication terminal connected thereto, in the form of vibration, to a user putting on wearable terminal 200.

Wearable terminal 200 illustrated in FIG. 35 includes communication device 210, processing device 220, vibration actuator 230 as a driving device, and housing 240.

Vibration actuator 230 is vibration actuator 100F of Embodiment 7 or vibration actuator 100G of Embodiment 8. Bottom surface 231 of vibration actuator 230 corresponds to the bottom plate of case 24 of vibration actuator 100F or 100G and is disposed along inner periphery surface 242 of housing 240, and, bottom surface 231 and inner peripheral surface 242 makes intimate contact with each other.

Housing 240 is formed in a ring shape, and is put on a user's finger in this case. At this time, inner periphery surface 242 of vibration actuator 230 is put on a fingertip. In this manner, vibration actuator 230 is put so as to make intimate contact with a portion where machine receptors densely present. Communication device 210 is wirelessly connected with a radio communication terminal such as a mobile phone, a smartphone, and a mobile amusement machine so as to receive a signal from the radio communication terminal and output the signal to processing device 220.

For example, the signal from the radio communication terminal to communication device 210 is a signal based on a communication scheme such as Bluetooth (registered trademark). Processing device 220 converts an input signal into a driving signal of vibration actuator 230 by a conversion circuit, and supplies the signal to vibration actuator 230 through a driving circuit (omitted in the drawing) connected with power supply part 41 of vibration actuator 230, thereby driving vibration actuator 230. In this manner, the movable member is vibrated, and wearable terminal 200 is vibrated. Housing 240 of wearable terminal 200 has a ring shape, and the movable member vibrates back and forth along bottom surface 231 of vibration actuator 230. Then, the vibration generated by the movable member sliding back and forth is directly transmitted from bottom surface 231 to the machine receptors. With this configuration, in comparison with the case where the vibration actuator is put on the back of a finger, or a location distanced from a fingertip, such as a location separated from a fingertip, the intensity of the sensory vibration onto a user can be further increased without changing the external shape, that is, with a predetermined size.

In addition, wearable terminal 200 can be downsized, and usability can be improved. It is to be noted that wearable terminal 200 may be a device having an incoming notification function and including communication device 210, processing device 220, and vibration actuator 230 as a driving device. With this configuration, the device having an incoming function may drive the vibration actuator to notify a user of incoming external information acquired with a radio communication terminal such as a mobile phone, a smartphone, and a mobile amusement machine. In addition to the incoming signal, the vibration of vibration actuator 230 may be increased and given to the user as a vibration corresponding to a signal input such as an incoming mail from an external apparatus to an information communication terminal, and/or a vibration corresponding to a game operation. It is to be noted that wearable terminal 200 may be provided with functions of inputting letters and/or numbers to a wirelessly connected apparatus by moving the terminal along a pattern of letters in the air, and functions of selecting information indicated on a display and the like connected thereto.

While metal spring (machine spring) 90 elastically support movable member 50 or 50F at the both sides thereof in the longitudinal direction with respect to fixing body 20, 20B, 20D, 20F or 20G in vibration actuators 100, 100B, 100D, 100E, 100F or 100G of Embodiments 1, 3, 5, 6, 7, or 8, metal spring (machine spring) 90 may be disposed on only one side to support movable member 50 or 50F. That is, in Embodiment 1 3, 5, 6, 7, or 8, magnet 60 or 60F includes opposing surface 61 or 61F that faces coil 40, 40B, 40D, 40E, 40F or 40G, and includes S pole and N pole disposed along the longitudinal direction (a vibration direction in one direction). Movable member 50 or 50F is elastically supported by fixing body 20, 20B, 20D, 20F, or 20G through a machine spring such as a metal spring and a resin spring disposed along the longitudinal direction on at least one of the opposing end sides of opposing surface 61 or 61F in the longitudinal direction (the vibration direction in one direction). Movable member 50 or 50F elastically supported by a machine spring on one side is vibrated back and forth with a magnetic attractive force or a Lorentz force generated by coil 40, 40B, 40D, 40E, 40F or 40G fed with power. For example, a coil-shaped spring is interposed between one upright piece 241 or 241F and movable member 50 or 50F as a machine spring, and movable member 50 or 50F is supported such that movable member 50 or 50F vibrates back and forth with expansion and contraction of the coil-shaped spring.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2015-223414 dated Nov. 13, 2015, the disclosure of which including the specification, drawings and abstract is incorporated herein by reference in its entirety.

INDUSTRIAL APPLICABILITY

The vibration actuator according to the embodiments of the present invention can be downsized, and can be favorably vibrated with excellent assemblability and durability even when downsized and formed in a flat shape. The vibration actuator according to the embodiments of the present invention is suitable for a wearable terminal capable of communicating with an information communication terminal, and a device having an incoming notification function for providing a user with incoming notification of an information communication terminal such as a mobile phone.

REFERENCE SIGNS LIST 20, 20A, 20B, 20C, 20D, 20F, 20G Fixing body
22, 22A, 22F Cover
24, 24F Case
241 Upright piece
26, 26F Housing
30, 30F Linear bearing
32, 32F Ball
34, 34F Rail
341, 341F Holder part
342, 342F Main body
343, 343F Projected wall part
40, 40A, 40B, 40C, 40D, 40E, 40F Coil
41, 41A, 41C, 41D, 41E, 41F, 41G Power supply part
45, 45B Positioning magnet (other magnet)
45C, 45G 3-pole core
45D, 45E, 451D, 452D Core
50, 50A, 50F Movable member
52, 52A, 52F Magnet holding part
54, 54F Roll contact part
541 Ball receiving portion (side surface of movable member)
60, 60A, 60F Magnet
61, 61F Opposing surface
70, 70A, 70F Yoke
90 Metal spring
100, 100A, 100B, 100C, 100D, 100E, 100F, 100G, 230 Vibration actuator
200 Wearable terminal
210 Communication device
220 Processing device
231 Bottom surface
240 Housing
242 Inner peripheral surface
524 Opening

The invention claimed is:

1. A vibration actuator comprising:
   a fixing body including a planar part and a flat coil disposed in the planar part; and
   a movable member including a magnet disposed opposite to the coil, the movable member being configured to vibrate back and forth in one direction with respect to the fixing body above the planar part by cooperation of the coil and the magnet, wherein:
   the fixing body includes a pair of linear bearings disposed along two side surfaces of the movable member, the two side surfaces being extended along the one direction, the pair of linear bearings including a ball capable of freely rolling and making contact with the two side surfaces, and
   the movable member is held through the ball of the pair of linear bearings such that the movable member is allowed to freely vibrate in the one direction.

2. The vibration actuator according to claim 1, wherein one of the pair of linear bearings includes two or more balls, and the other of the pair of linear bearings includes one or more balls.

3. The vibration actuator according to claim 1, wherein a plurality of the balls are provided in each of the pair of linear bearings such that a number of the balls of one of the linear bearings and a number of the balls of the other of the linear bearings are equal to each other.

4. The vibration actuator according to claim 1, wherein:
   the magnet includes an opposing surface facing the coil, wherein an S pole and an N pole are disposed along the one direction in the opposing surface;
   the movable member is elastically supported to the fixing body by a machine spring disposed along the one direction on at least one of two sides of the opposing surface in the one direction; and
   the movable member vibrates back and forth with a Lorentz force generated by the coil fed with power.

5. The vibration actuator according to claim 4, wherein the machine spring is a coil spring.

6. The vibration actuator according to claim 1, wherein:
   the magnet includes an opposing surface facing the coil, wherein an S pole and an N pole are disposed along the one direction in the opposing surface;
   the planar part includes a second magnet facing the S pole and the N pole of the opposing surface of the magnet, wherein magnetic poles of the second magnet are disposed such that polarities of the magnetic poles of the second magnet are opposite to respective polarities of the magnetic poles of the opposing surface; and the second magnet forms a magnetic spring that elastically supports the movable member with a magnetic attractive force generated between the magnets together with the movable member.

7. The vibration actuator according to claim 1 further comprising a center core composed of a magnetic substance projected from the planar part in a center portion of the coil, the center core being configured to form a magnetic spring together with the magnet.

8. The vibration actuator according to claim 7, wherein:

an outer core composed of a magnetic substance is provided on the planar part and outside the coil in the one direction; and the outer core forms the magnetic spring that elastically supports the movable member together with the planar part, the center core and the magnet.

9. The vibration actuator according to claim 1, wherein the planar part is composed of a magnetic substance.

10. The vibration actuator according to claim 1, wherein:

the movable member includes a magnet holding part that holds the magnet; and the magnet holding part is made of a material whose specific gravity is greater than 7.8.

11. The vibration actuator according to claim 1, wherein an external shape of the vibration actuator is a flat shape having an arcuate shape in cross section.

12. A wearable terminal including the vibration actuator according to claim 1.

13. The wearable terminal according to claim 12, wherein an external shape of the wearable terminal is a ring shape.

14. An incoming notification device including the vibration actuator according to claim 1.

* * * * *